US012806899B2

(12) United States Patent
Taniuchi et al.

(10) Patent No.: US 12,806,899 B2
(45) Date of Patent: Nov. 24, 2026

(54) LIQUID EJECTION APPARATUS

(71) Applicant: SEIKO EPSON CORPORATION, Tokyo (JP)

(72) Inventors: Akinori Taniuchi, Matsumoto (JP); Madoka Goi, Matsumoto (JP); Yoshitaka Matsubara, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 153 days.

(21) Appl. No.: 18/895,596

(22) Filed: Sep. 25, 2024

(65) Prior Publication Data

US 2025/0100273 A1 Mar. 27, 2025

(30) Foreign Application Priority Data

Sep. 26, 2023 (JP) ................................. 2023-162867

(51) Int. Cl.
*B41J 2/045* (2006.01)

(52) U.S. Cl.
CPC ....... *B41J 2/04541* (2013.01); *B41J 2/04581* (2013.01); *B41J 2/04588* (2013.01); *B41J 2/04595* (2013.01)

(58) Field of Classification Search
CPC ................ B41J 2/04541; B41J 2/04581; B41J 2/04588; B41J 2/04595
See application file for complete search history.

(56) References Cited

U.S. PATENT DOCUMENTS

2011/0134176 A1* 6/2011 Matsuo ................ B41J 2/04581 347/10
2021/0094290 A1 4/2021 Mawatari
2022/0297425 A1* 9/2022 Hashimoto .......... B41J 2/04595

FOREIGN PATENT DOCUMENTS

JP 2017-140761 A 8/2017
WO 2019/135305 A1 7/2019

* cited by examiner

*Primary Examiner* — Yaovi M Ameh
(74) *Attorney, Agent, or Firm* — Harness, Dickey & Pierce, P.L.C.

(57) ABSTRACT

A liquid ejection apparatus comprises an ejection unit that is configured to eject a liquid from the nozzle by driving a drive element in accordance with a drive signal that is supplied to the drive element. The drive signal includes a first ejection pulse and a second ejection pulse in chronological order. The first ejection pulse includes a first expansion element that changes from a first potential to a second potential. The second ejection pulse includes a second expansion element that changes from a fourth potential to a fifth potential. The time length of a first period that is a period in which the second expansion element changes from the fourth potential to the fifth potential is longer than the time length of a second period that is a period in which the first expansion element changes from the first potential to the second potential.

17 Claims, 13 Drawing Sheets

| Sd[m] | D[m] | QS[m] | |
|---|---|---|---|
| | | TQ1 | TQ2 |
| 1 | DP-1 | H | H |
| 2 | DP-2 | L | H |
| 3 | DP-3 | H | L |
| 4 | DP-N | L | L |

LIQUID EJECTION APPARATUS

The present application is based on, and claims priority from JP Application Serial Number 2023-162867, filed Sep. 26, 2023, the disclosure of which is hereby incorporated by reference herein in its entirety.

BACKGROUND

1. Technical Field

The present disclosure relates to a circuit device and a method of setting the circuit device.

2. Related Art

A liquid ejection apparatus, such as an ink jet printer, drives a piezoelectric element in the ejection unit of the liquid ejection apparatus with a drive signal to eject a liquid, such as ink, with which the pressure chamber in the ejection unit is filled as droplets from a nozzle to form an image on a medium such as recording paper.

In such a liquid ejection apparatus, for example, as described in JP-A-2017-140761, one droplet ejected from a nozzle may be merged with another droplet ejected from the nozzle after the one droplet is ejected, before landing on the medium.

However, when the drive cycle of the ejection unit is shortened to meet the recent demand for a faster printing speed, the interval between the ejection of one droplet from the nozzle and the ejection of another droplet is shorter, resulting in instability in the ejection of the another droplet.

SUMMARY

According to an aspect of the present disclosure, a liquid ejection apparatus includes an ejection unit including a nozzle from which a liquid to be landed on a medium is ejected, a pressure chamber that is in communication with the nozzle and through which a liquid flows, and a drive element that causes the liquid in the pressure chamber to pressure fluctuate when a drive signal is supplied, and a drive signal generator that generates the drive signal, wherein the drive signal includes a plurality of ejection pulses corresponding to a plurality of droplets that merges before landing on a medium, wherein a first ejection pulse, of the plurality of ejection pulses, the first ejection pulse being a first pulse in chronological order, includes a first expansion element that changes from a first potential to a second potential and drives the drive element so as to expand a volume of the pressure chamber, and a first ejection element that changes from the second potential to a third potential, contracts the volume of the pressure chamber that was expanded by the first expansion element, and ejects a droplet from the nozzle, wherein a second ejection pulse, of the plurality of ejection pulses, the second ejection pulse being a pulse following the first ejection pulse in chronological order, includes a second expansion element that changes from a fourth potential to a fifth potential and drives the drive element so as to expand the volume of the pressure chamber, and a second ejection element that changes from the fifth potential to a sixth potential, contracts the volume of the pressure chamber that was expanded by the second expansion element, and ejects a droplet from the nozzle, and wherein a time length of a first period that is a period of time during which the second expansion element changes from the fourth potential to the fifth potential is longer than a time length of a second period that is a period of time during which the first expansion element changes from the first potential to the second potential.

DESCRIPTION OF EMBODIMENTS

Hereinafter, embodiments for carrying out the present disclosure will be described with reference to the drawings. However, in each figure, the size and scale of each part are appropriately changed from the actual ones. In addition, since the embodiments described below are preferable specific examples of the present disclosure, there are various technically preferred limitations. However, the scope of the present disclosure is not limited to these embodiments unless otherwise specified in the following description.

1. First Embodiment

In the present embodiment, a liquid ejection apparatus will be described by exemplifying an ink jet printer that ejects ink to form an image on recording paper PR.

1-1. Overview of Ink Jet Printer

The configuration of an ink jet printer 1 according to the present embodiment will be described with reference to FIGS. 1 and 3.

Figure 1:
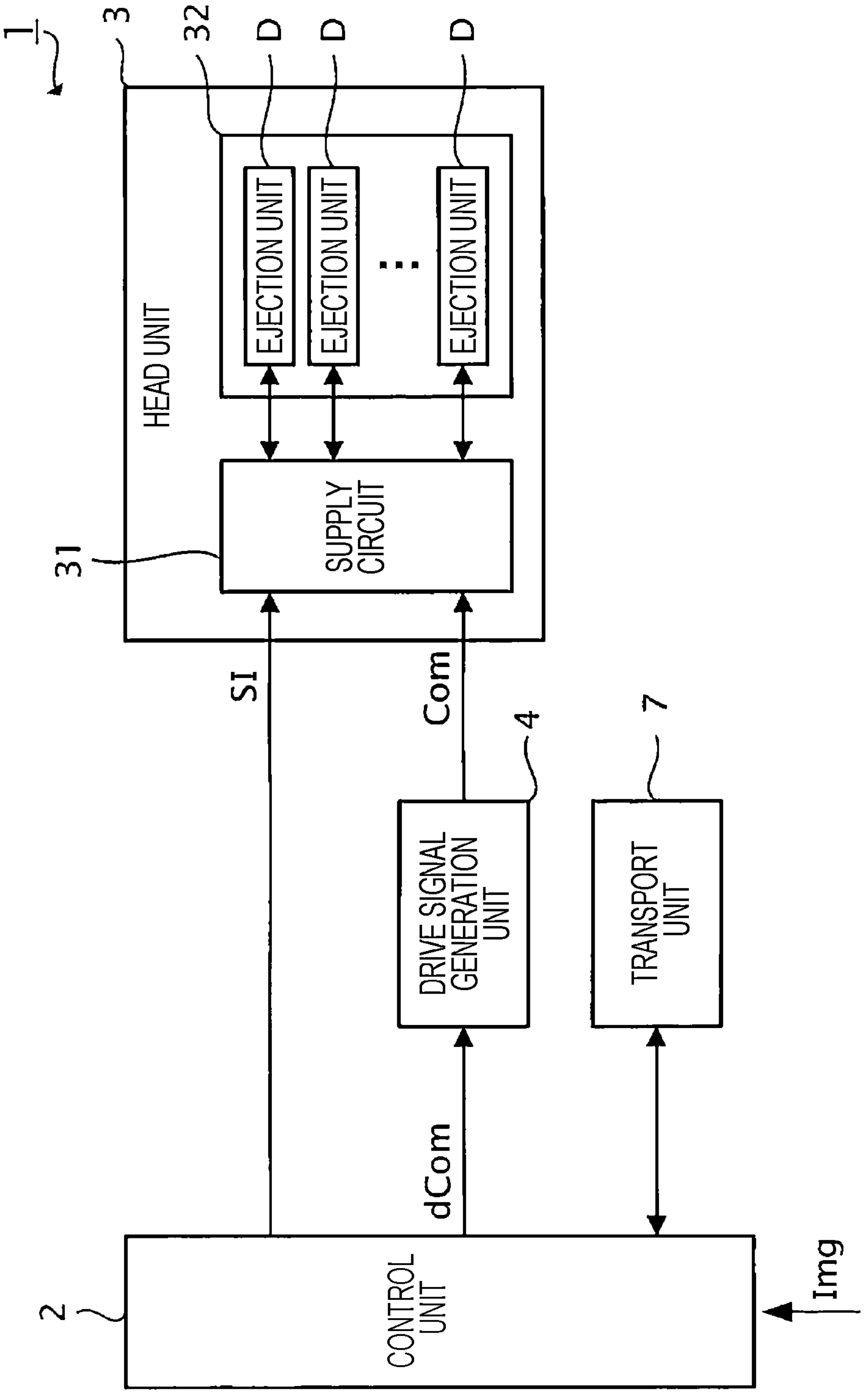
FIG. 1 is a functional block diagram showing an example of the configuration of an ink jet printer.

FIG. 1 is a functional block diagram showing an example of the configuration of the ink jet printer 1.

As shown in FIG. 1, the ink jet printer 1 is supplied with print data Img that indicates the image to be formed by the ink jet printer 1 from a host computer such as a personal computer or digital camera. The ink jet printer 1 performs a printing process of forming an image indicated by the print data Img supplied from the host computer on the recording paper PR.

The ink jet printer 1 includes a control unit 2 that controls each component of the ink jet printer 1, a head unit 3 including an ejection unit D that ejects ink, a drive signal generation unit 4 that generates a drive signal Com for driving the ejection unit D, and a transport unit 7 that changes the relative position of the recording paper PR to the head unit 3.

The ink is an example of a “liquid” and the recording paper PR is an example of a “medium. The ink jet printer 1 that ejects the ink is an example of a “liquid ejection apparatus”. The drive signal generation unit 4 that generates the drive signal Com for driving the head unit 3, for example, includes one or more electric circuits and is an example of a “drive signal generator”.

In the present embodiment, the ink jet printer 1 includes one or more head units 3 and one or more drive signal generation units 4 that correspond one-to-one to the one or more head units 3. Specifically, the present embodiment assumes that the ink jet printer 1 includes four head units 3 and four drive signal generation units 4 that correspond one-to-one to the four head units 3. However, for convenience of explanation, the following description may focus on one head unit 3 out of the four head units 3 and one drive signal generation unit 4, out of the four drive signal generation units 4, corresponding to the one head unit 3, as shown in FIG. 1.

The control unit 2 includes one or more CPUs. The control unit 2 may include a programmable logic device such as an FPGA instead of or in addition to the CPU. Here, the CPU is an abbreviation for a central processing unit and the FPGA is an abbreviation for a field-programmable gate array. The control unit 2 includes a memory. The memory includes one or both of a volatile memory such as a random access memory (RAM), and a nonvolatile memory such as a read only memory (ROM), an electrically erasable programmable read-only memory (EEPROM), or a programmable ROM (PROM).

As described in detail below, the control unit 2 generates signals for controlling the operation of various components of the ink jet printer 1, such as a print signal SI and a waveform designation signal dCom. Here, the waveform designation signal dCom is a digital signal that defines the waveform of the drive signal Com. The drive signal Com is an analog signal that drives the ejection unit D. The drive signal generation unit 4 includes a DA conversion circuit and generates the drive signal Com with a waveform defined by the waveform designation signal dCom. The print signal SI is a digital signal that designates the type of operation of the ejection unit D. Specifically, the print signal SI is a signal that designates the type of operation of the ejection unit D by designating whether the drive signal Com is supplied to the ejection unit D.

As shown in FIG. 1, the head unit 3 includes a supply circuit 31 and a recording head 32.

The recording head 32 includes M ejection units D. The value M is a natural number satisfying “M≥1”. In the following, the m-th ejection unit D among the M ejection units D provided in the recording head 32 may be referred to as an ejection unit D[m]. The variable m is a natural number that satisfies “1≤m≤M”. In the following, when a component, a signal, or the like of the ink jet printer 1 corresponds to the ejection unit D[m] of the M ejection units D, a subscript [m] may be added to the sign in order to represent the component, the signal, or the like concerned.

The supply circuit 31 switches whether the drive signal Com is supplied to the ejection unit D[m] based on the print signal SI. In the following, a drive signal Com supplied to the ejection unit D[m] in the drive signal Com may be referred to as a supply drive signal Vin[m].

As described above, in the present embodiment, the ink jet printer 1 executes a printing process. When the printing process is executed, control unit 2 generates signals for controlling the head unit 3, such as the print signal SI, based on the print data Img. When the printing process is executed, the control unit 2 generates signals for controlling the drive signal generation unit 4, such as the waveform designation signal dCom. The control unit 2 also generates signals for controlling the transport unit 7 when the printing process is executed. As a result, the control unit 2 controls the transport unit 7 so that the relative position of the recording paper PR to the head unit 3 is changed during the printing process, while adjusting presence or absence of the ink ejection from the ejection unit D[m], the ink ejection amount, the ink ejection timing, and the like, and controls each component of the ink jet printer 1 so that the image corresponding to the print data Img is formed on the recording paper PR.

Figure 2:
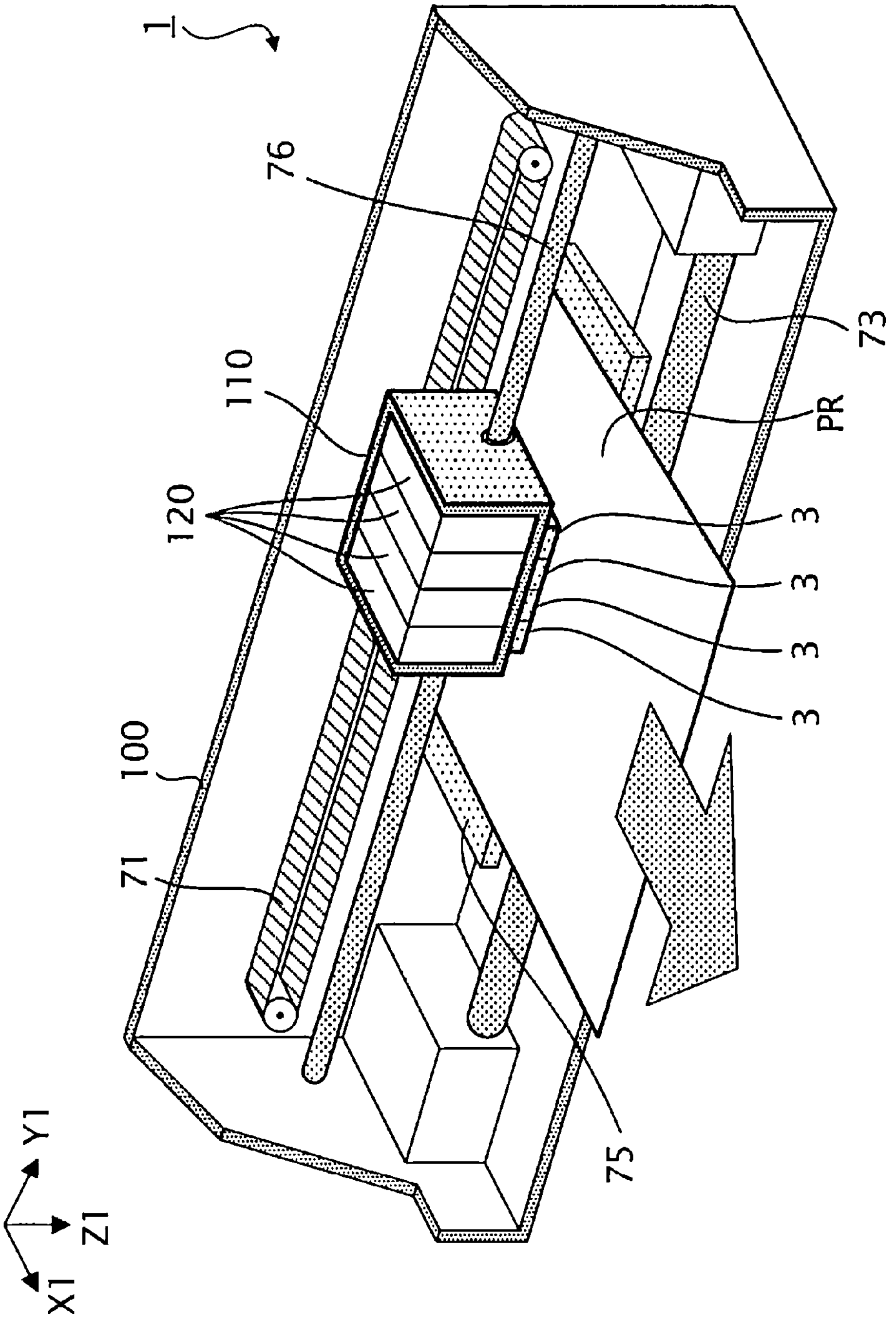
FIG. 2 is a perspective view showing an example of the schematic internal structure of the ink jet printer.

FIG. 2 is a perspective view showing an example of the schematic internal structure of the ink jet printer 1.

As shown in FIG. 2, the present embodiment assumes that the ink jet printer 1 is a serial printer. Specifically, when executing the printing process, the ink jet printer 1 transports the recording paper PR in the X1 direction while causing the head unit 3 to reciprocate in the Y1 direction that intersects the X1 direction and in the Y2 direction, which is the opposite direction of the Y1 direction, and ejects the ink from the ejection unit D[m] to form a dot Dt according to the print data Img on the recording paper PR. In the following, the X1 direction and the X2 direction, which is opposite to the X1 direction, are collectively referred to as the “X axis direction”, the Y1 direction intersecting the X axis direction and the Y2 direction, which is opposite to the Y1 direction, are collectively referred to as the “Y axis direction”, and the Z1 direction intersecting the X axis direction and the Y axis direction and the Z2 direction, which is opposite to the Z1 direction, are collectively referred to as the “Z axis direction”. In the present embodiment, as an example, description is made assuming that the X axis direction, the Y axis direction, and the Z axis direction are orthogonal to each other. However, the present disclosure is not limited to such an aspect. The X axis direction, the Y axis direction, and the Z axis direction are only required to intersect each other. In the present embodiment, the Z1 direction is a direction in which the ink is ejected from the ejection unit D[m].

As shown in FIG. 2, the ink jet printer 1 according to the present embodiment includes a housing 100 and a carriage 110 that can reciprocate in the Y axis direction within the housing 100 and that carries four head units 3. In the present embodiment, as shown in FIG. 2, it is assumed that the carriage 110 stores four ink cartridges 120 corresponding one-to-one to the four colors of ink: cyan, magenta, yellow, and black. In the present embodiment, as described above, it is assumed that the ink jet printer 1 includes the four head units 3 corresponding one-to-one to the four ink cartridges 120. Each ejection unit D[m] receives the supply of ink from the ink cartridge 120 corresponding to the head unit 3 in which the ejection unit D[m] is installed. This allows each ejection unit D[m] to be filled with the supplied ink and eject the ink from the nozzle N. The ink cartridge 120 may be located outside of the carriage 110.

As mentioned above, the ink jet printer 1 according to the present embodiment includes the transport unit 7. The transport unit 7, as shown in FIG. 2, includes a carriage transport mechanism 71 for reciprocating the carriage 110 in the Y axis direction, a carriage guide shaft 76 that reciprocably supports the carriage 110 in the Y axis direction, a medium transport mechanism 73 for transporting the recording paper PR, a platen 75 provided under the carriage 110 in the Z1 direction. When the printing process is executed, the carriage transport mechanism 71 of the transport unit 7 causes the head unit 3 together with the carriage 110 to reciprocate along the carriage guide shaft 76 in the Y axis direction, the medium transport mechanism 73 transports the recording paper PR on the platen 75 in the X1 direction, thereby making it possible to change the relative position of the recording paper PR to the head unit 3, and the ink can land on the entire recording paper PR.

Figure 3:
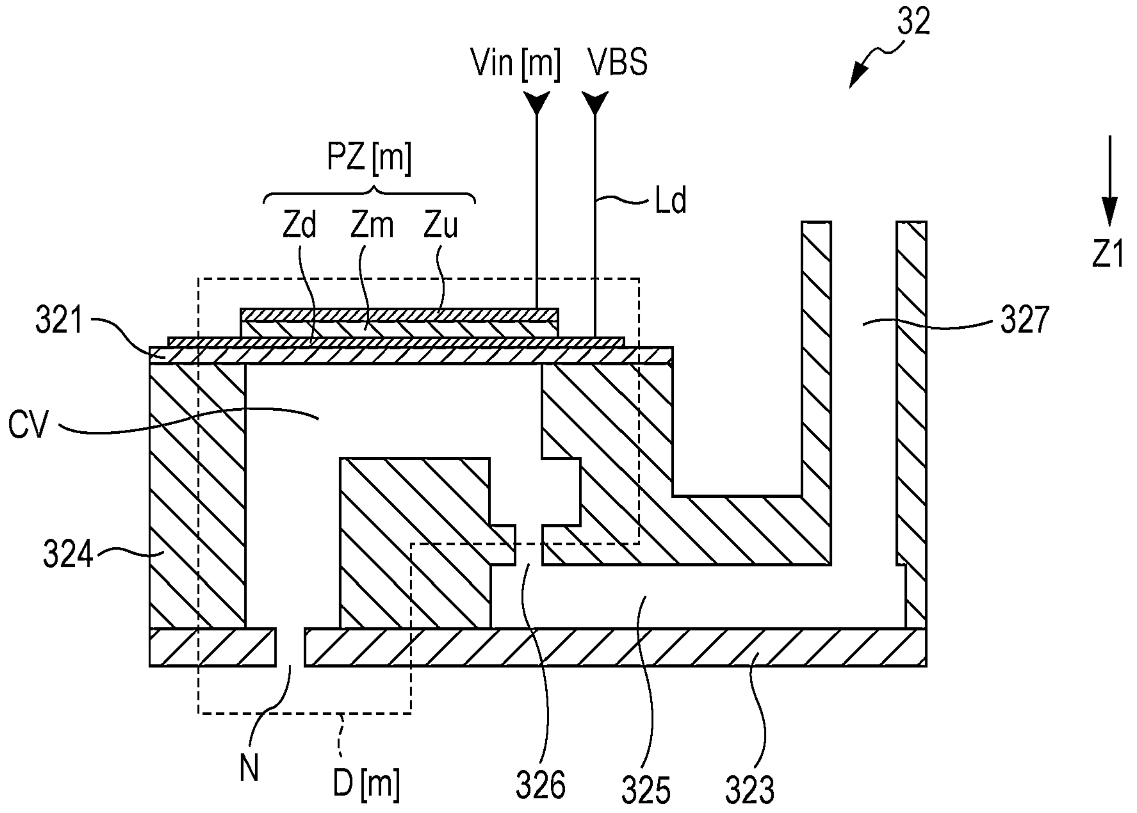
FIG. 3 is a schematic partial cross-sectional view of a recording head.

FIG. 3 shows a schematic partial cross-sectional view of the recording head 32, with the recording head 32 cut so as to include the ejection unit D[m].

As shown in FIG. 3, the ejection unit D[m] includes a piezoelectric element PZ[m], a cavity CV filled with the ink, a nozzle N in communication with the cavity CV, and a vibration plate 321. The cavity CV is an example of a "pressure chamber". The piezoelectric element PZ[m] is an example of a "drive element". The ejection unit D[m] ejects the ink in the cavity CV from the nozzle N when the piezoelectric element PZ[m] is driven by the supply drive signal Vin[m]. The cavity CV is a space partitioned by a cavity plate 324, a nozzle plate 323 in which the nozzle N is formed, and the vibration plate 321. The cavity CV is in communication with a reservoir 325 via an ink supply port 326. The reservoir 325 is in communication with an ink cartridge 120 corresponding to the ejection unit D[m] via an ink intake port 327. The piezoelectric element PZ[m] includes an upper electrode Zu[m], a lower electrode Zd[m], and a piezoelectric body Zm[m] provided between the upper electrode Zu[m] and the lower electrode Zu[m]. The lower electrode Zd[m] is electrically coupled to a power supply line LD set at a potential VBS. When the supply drive signal Vin[m] is supplied to the upper electrode Zu[m] and a voltage is applied between the upper electrode Zu[m] and the lower electrode Zd[m], the piezoelectric element PZ[m] is displaced in the Z1 direction or the Z2 direction according to the applied voltage. As a result, the piezoelectric element PZ[m] vibrates. The lower electrode Zd[m] is joined to the vibration plate 321. Therefore, when the piezoelectric element PZ[m] is driven by the supply drive signal Vin[m] and vibrates, the vibration plate 321 also vibrates. The vibration of the vibration plate 321 changes the volume of the cavity CV and the pressure in the cavity CV, and the ink with which the cavity CV is filled is ejected from the nozzle N.

Part of the ink ejected from the nozzles N in the printing process is changed to mist before landing on the recording paper PR and floats inside the housing 100.

1-2. Overview of Head Unit

Figure 4:
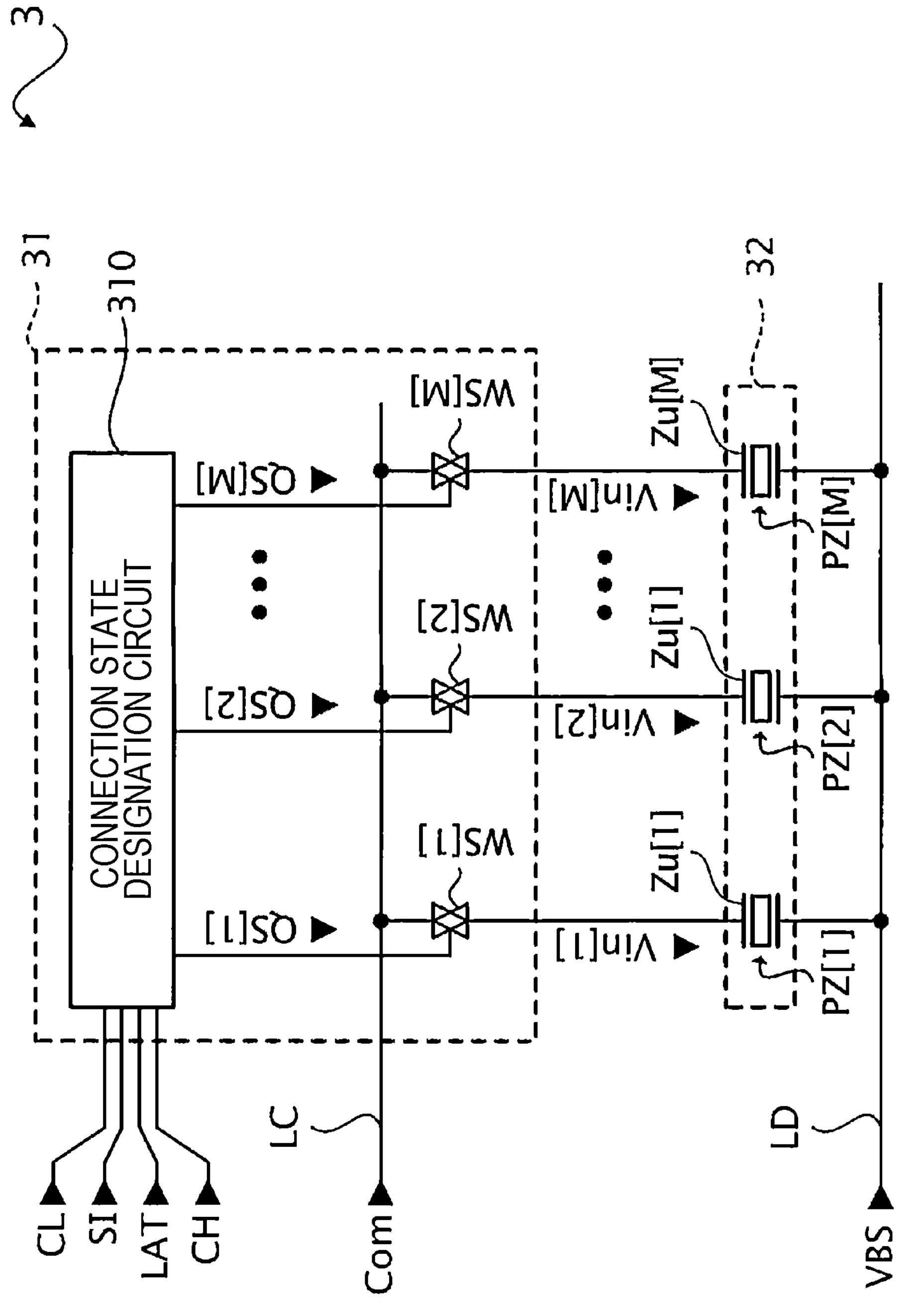
FIG. 4 is a block diagram showing an example of the configuration of a head unit.
Figures 5, 6:
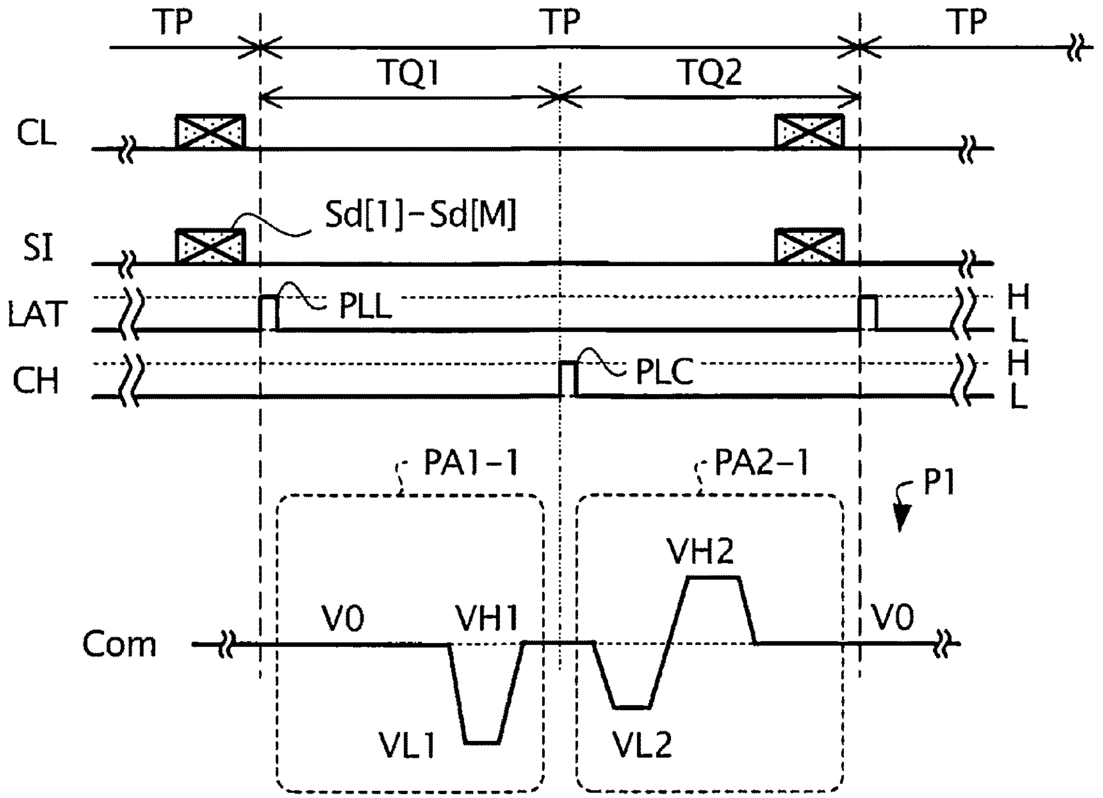
FIG. 5 is a timing chart showing various signals such as a drive signal Com supplied to the head unit.
FIG. 6 is an explanatory diagram of an individual designation signal Sd[m].

The following is an overview of the head unit 3 with reference to FIGS. 4 through 6.

FIG. 4 is a block diagram showing an example of the configuration of the head unit 3.

As shown in FIG. 4, the head unit 3 includes the supply circuit 31 and the recording head 32. The head unit 3 includes a wire LC through which the drive signal Com is supplied from the drive signal generation unit 4.

As shown in FIG. 4, the supply circuit 31 includes M switches WS[1] to WS[M] that correspond one-to-one to M ejection units D[1] to D[M], and a coupling state designation circuit 310 that designates the coupling state of each switch. The coupling state designation circuit 310 generates a coupling state designation signal QS[m] that designates the ON/OFF of a switch WS[m] based on at least some of the print signal SI, a latch signal LAT, and a change signal CH supplied from the control unit 2. The switch WS[m] switches between conduction and non-conduction between the wire LC and the upper electrode Zu[m] of the piezoelectric element PZ[m] in the ejection unit D[m] based on the coupling state designation signal QS[m]. In the present embodiment, the switch WS[m] turns on when the coupling state designation signal QS[m] is at the high level and turns off when it is at the low level. When the switch WS[m] is turned on, the drive signal Com supplied to the wire LC is supplied to the upper electrode Zu[m] of the ejection unit D[m] as the supply drive signal Vin[m].

In the present embodiment, when the ink jet printer 1 executes the printing process, one or more unit periods TP are set as the operating periods of the ink jet printer 1. In each unit period TP, the ink jet printer 1 according to the present embodiment can drive each ejection unit D[m] for the printing process.

FIG. 5 is a timing chart showing various signals such as the drive signal Com supplied to the head unit 3 in the unit period TP.

As shown in FIG. 5, the control unit 2 outputs the latch signal LAT with a pulse PLL. In this way, the control unit 2 defines the unit period TP as a period from the rise of the pulse PLL to the rise of the next pulse PLL. The control unit 2 outputs the change signal CH with a pulse PLC in the unit period TP. The control unit 2 then divides the unit period TP into two drive periods: a drive period TQ1 from the rise of the pulse PLL to the rise of the pulse PLC, and a drive period TQ2 from the rise of the pulse PLC to the rise of the pulse PLL.

As shown in FIG. 5, the print signal SI includes M individual designation signals Sd[1] to Sd[M] that correspond one-to-one to the M ejection units D[1] to D[M]. The individual designation signal Sd[m] designates a mode in which the ejection unit D[m] is driven in each unit period TP when the ink jet printer 1 executes the printing process. Prior to each unit period TP, the control unit 2 supplies the print signal SI containing M individual designation signals Sd[1] to Sd[M] to the coupling state designation circuit 310 with the print signal SI being synchronized with a clock signal CL. Then, the coupling state designation circuit 310 generates the coupling state designation signal QS[m] based on the individual designation signal Sd[m] in the relevant unit period TP.

In the present embodiment, in the unit period TP in which the printing process is executed, it is assumed that the ejection unit D[m] can form any dot Dt of a large dot including the ink with an ink amount ξ1, a medium dot including the ink with an ink amount ξ2 less than the ink amount ξ1, and a small dot including the ink with an ink amount ξ3 less than the ink amount ξ2.

FIG. 6 is an explanatory diagram of the individual designation signal Sd[m].

As shown in FIG. 6, in the present embodiment, the individual designation signal Sd[m] can have any one of the four values of the value "1" to designate the ejection unit D[m] as a large dot-forming ejection unit DP-1, the value "2" to designate the ejection unit D[m] as a medium dot-forming ejection unit DP-2, the value "3" to designate the ejection unit D[m] as a small dot-forming ejection unit DP-3, and the value "4" to designate the ejection unit D[m] as a no-dot-forming ejection unit DP-N in the unit period TP during which the printing process is executed. Here, the large dot-forming ejection unit DP-1 is the ejection unit D that forms a large dot in the unit period TP. The medium dot-forming ejection unit DP-2 is the ejection unit D that forms a medium dot in the unit period TP. The small dot-forming ejection unit DP-3 is the ejection unit D that forms a small dot in the unit period TP. The no-dot-forming ejection unit DP-N is the ejection unit D that forms no dot in the unit period TP.

The description is returned to FIG. 5. As shown in FIG. 5, in the present embodiment, the drive signal Com includes a waveform P1 provided in the unit period TP. The waveform P1 includes a waveform PA1-1 in the drive period TQ1 and a waveform PA2-1 in the drive period TQ2. The ejection pulse corresponding to the waveform PA1-1 in the drive signal Com is an example of a "first ejection pulse". The ejection pulse corresponding to the waveform PA2-1 in the drive signal Com is an example of a "second ejection pulse". In the waveform P1, the potential at the beginning of the unit period TP is a reference potential V0. In the waveform P1, the potential at the end of the unit period TP is the reference potential V0. The waveform PA1-1 is a waveform that starts at the reference potential V0, goes through a potential VL1 that is lower than the reference potential V0, and then reaches a potential VH1. In the present embodiment, it is assumed that the VH1 is equal to the V0. The waveform PA1-1 is defined so that when the supply drive signal Vin[m] having the waveform PA1-1 is supplied to the ejection unit D[m], the ink corresponding to an ink amount 91 is ejected from the ejection unit D[m]. The waveform PA2-1 is a waveform that starts at the potential VH1, goes through a potential VL2 that is lower than the reference potential V0, and a potential VH2 that is higher than the reference potential V0, and then returns to the reference potential V0. The waveform PA2-1 is defined so that when the supply drive signal Vin[m] having the waveform PA2-1 is supplied to the ejection unit D[m], the ink corresponding to an ink amount φ2 is ejected from the ejection unit D[m]. The waveform PA1-1 and the waveform PA2-2 are defined so that a droplet ejected from the ejection unit D[m] with the waveform PA1-1 and a droplet ejected from the ejection unit D[m] with the waveform PA1-2 merge before landing on the medium when the supply drive signal Vin[m] with the waveform PA1-1 and the waveform PA2-1 is supplied to the ejection unit D[m], and the merged droplets correspond to the ink amount ξ1.

In the present embodiment, it is assumed that the ink amount ξ1 corresponds to an ink amount greater than or equal to the sum of the ink amount φ1 and the ink amount φ2, the ink amount ξ2 corresponds to the ink amount φ2, and the ink amount ξ3 corresponds to the ink amount φ1.

As shown in FIG. 6, when the individual designation signal Sd[m] indicates the value "1" that designates the ejection unit D[m] as the large dot-forming ejection unit DP-1 in the unit period TP, the coupling state designation circuit 310 sets the coupling state designation signal QS[m] to a high level during the drive period TQ1 and the drive period TQ2. In this case, the switch WS[m] turns on during the drive period TQ1 and the drive period TQ2. Therefore, the ejection unit D[m] is driven by the supply drive signal Vin[m] having the waveform PA1-1 and the waveform PA2-1 in the unit period TP, and ejects the ink with the ink amount ξ1 corresponding to a large dot. When the individual designation signal Sd[m] indicates the value "2" that designates the ejection unit D[m] as the medium dot-forming ejection unit DP-2 in the unit period TP, the coupling state designation circuit 310 sets the coupling state designation signal QS[m] to a low level during the drive period TQ1 and to a high level during the drive period TQ2. In this case, the switch WS[m] turns off during the drive period TQ1 and turns on during the drive period TQ2. Therefore, the ejection unit D[m] is driven by the supply drive signal Vin[m] having the waveform PA2-1 in the unit period TP, and ejects the ink with the ink amount ξ2 corresponding to a medium dot. When the individual designation signal Sd[m] indicates the value "3" that designates the ejection unit D[m] as the small dot-forming ejection unit DP-3 in the unit period TP, the coupling state designation circuit 310 sets the coupling state designation signal QS[m] to a high level during the drive period TQ1 and to a low level during the drive period TQ2. In this case, the switch WS[m] turns on during the drive period TQ1 and turns off during the drive period TQ2. Therefore, the ejection unit D[m] is driven by the supply drive signal Vin[m] having the waveform PA1-1 in the unit period TP, and ejects the ink with the ink amount ξ3 corresponding to a small dot. When the individual designation signal Sd[m] indicates the value "4" that designates the ejection unit D[m] as the no-dot-forming ejection unit DP-N in the unit period TP, the coupling state designation circuit 310 sets the coupling state designation signal QS[m] to a low level during the unit period TP. In this case, the switch WS[m] turns off during the unit period TP. Therefore, the ejection unit D[m] is not driven by the supply drive signal Vin[m] having the waveform PA1-1 or the waveform PA2-1 in the unit period TP and does not eject the ink.

1-3. Waveform of Drive Signal Com in First Embodiment

Figure 7:
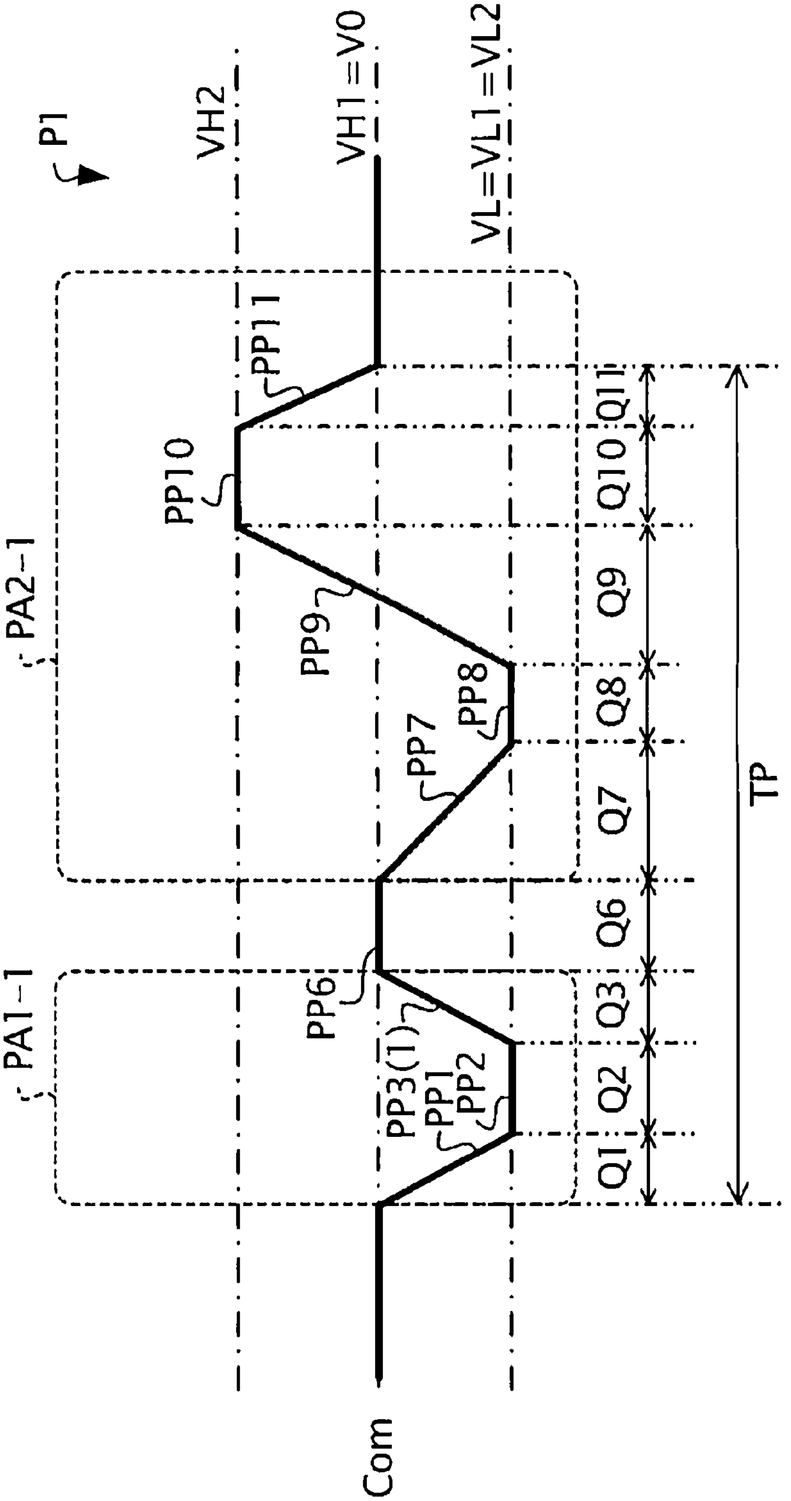
FIG. 7 is an example of a timing chart showing a drive signal Com in an example in the related art.

FIG. 7 is an example of a timing chart showing the drive signal Com in the first embodiment. In FIG. 7, a potential VL=the potential VL1=the potential VL2. The potential VH1 is equal to the reference potential V0. In the example shown in FIG. 7, the potential VH2 is higher than the potential VH1. The potential VL is lower than the reference potential V0. As illustrated in FIG. 7, in the first embodiment, the unit period TP is divided into nine control periods Q1 to Q3 and Q6 to Q11.

Here, the waveform PA1-1 includes, in chronological order, a waveform PP1 in the control period Q1, a waveform PP2 in the control period Q2, and a waveform PP3(1) in the control period Q3. The waveform PP1 is a waveform that changes from the reference potential V0 to the potential VL1. The waveform PP2 is a waveform that maintains the potential VL1 from the end of the waveform PP1 to the beginning of the waveform PP3(1). The waveform PP3(1) is a waveform that changes from the potential VL1 to the potential VH1. In the present disclosure, "one signal maintains one potential during one period" is a concept that includes the case where "one signal maintains a potential that matches one potential during one period" as well as the case where "one signal maintains a potential that matches one potential during one period by design" and the case where "if noise is eliminated, one signal can be regarded as maintaining a potential that matches one potential during one period".

In chronological order, the waveform PA2-1 includes a waveform PP7 in the control period Q7, a waveform PP8 in the control period Q8, a waveform PP9 in the control period Q9, a waveform PP10 in the control period Q10, and a waveform PP11 in the control period Q11. The waveform PP7 is a waveform that changes from the potential VH1 to the potential VL2. The waveform PP8 is a waveform that maintains the potential VL2. The waveform PP9 is a waveform that changes from the potential VL2 to the potential VH2. The waveform PP10 is a waveform that maintains the potential VH2. The waveform PP11 is a waveform that changes from the potential VH2 to the reference potential V0.

A waveform PP6 couples the waveform PA1-1 and the waveform PA2-1 in the control period Q6. In FIG. 7, the waveform PP6 maintains the potential VH1. As shown above, in the example shown in FIG. 7, the potential VH1 is equal to the reference potential V0. The ink jet printer 1 can ensure printing gradation by ensuring that the period from the rise to the fall of the pulse PLC in the change signal CH is included in the period from the beginning to the end of the waveform PP6.

As an example, the present embodiment assumes that the volume of the cavity CV included in the ejection unit D[m] is smaller when a potential of the supply drive signal Vin[m] supplied to the ejection unit D[m] is high than when the potential is low. Therefore, when the ejection unit D[m] is driven by the supply drive signal Vin[m] having the waveform PA1-1, or the like, the ink in the ejection unit D[m] is ejected from the nozzle N when the potential of the supply drive signal Vin[m] changes from a low potential to a high potential. However, as an alternative method, the volume of the cavity CV included in the ejection unit D[m] may be larger when a potential of the supply drive signal Vin[m] is high than when the potential is low. In this case, the high and low potentials in each of the following embodiments should be treated in a opposite way.

In the waveform PP1 of the control period Q1, the potential of the drive signal Com changes from a high potential to a low potential, so that the volume of the cavity CV is expanded. In the waveform PP2 of the control period Q2, the potential of the drive signal Com is maintained at the potential VL1, so that the volume of the cavity CV is also maintained. In the waveform PP3(1) of the control period Q3, the potential of the drive signal Com changes from a low potential to a high potential, so that the volume of the cavity CV contracts and a droplet is ejected from the nozzle N. In the waveform PP6 of the control period Q6, the potential of the drive signal Com is maintained at the potential VH1, so that the volume of the cavity CV is also maintained. In the waveform PP7 of the control period Q7, the potential of the drive signal Com changes from a high potential to a low potential, so that the volume of the cavity CV is expanded. In the waveform PP8 of the control period Q8, the potential of the drive signal Com is maintained at the potential VL2, so that the volume of the cavity CV is also maintained. In the waveform PP9 of the control period Q9, the potential of the drive signal Com changes from a low potential to a high potential, so that the volume of the cavity CV contracts and a droplet is ejected from the nozzle N. In the waveform PP10 of the control period Q10, the potential of the drive signal Com is maintained at the potential VH2, so that the volume of the cavity CV is also maintained. In the waveform PP11 of the control period Q11, the potential of the drive signal Com changes from a high potential to a low potential, so that the volume of the cavity CV is expanded.

The waveform PP10 and the waveform PP11 have the effect of suppressing the residual vibration of the liquid in the ejection unit D by the waveform PP11 causing the volume of the cavity CV to expand at the timing when the pressure of the ink in the cavity CV increases due to residual pressure vibration of the ink in the ejection unit D after waveform PP is supplied to the piezoelectric element PZ. The waveform PP11 is an example of a “damping element”.

The time length of the control period Q7 that is the period of a change from the potential VH1 to the potential VL2 in the waveform PP7 is longer than the time length of the control period Q1 that is the period of a change from the reference potential V0 to the potential VL1 in the waveform PP1. Preferably, the time length of the control period Q7 is 1.5 times or more and 3 times or less the time length of the control period Q1.

When the time length of the control period Q7 is shorter than the time length of the control period Q1, the droplet ejected with the waveform PA2-1 is elongated and the shape of the droplet tends to be constricted in the middle, so that the ink easily scatters from the nozzle N. The ink jet printer 1 can reduce scattering of the ink from the nozzle N by making the time length of the control period Q7 longer than the time length of the control period Q1.

In other words, the rate of change in the waveform PP7 from the potential VH1 to the potential VL2 is smaller than the rate of change in the waveform PP1 from the reference potential V0 to the potential VL1.

The waveform PP7 monotonically decreases from the potential VH1 to the potential VL2. In the example shown in FIG. 7, the waveform PP7 monotonically decreases, but as an alternative, when the potential VL2 is higher than the reference potential V0, the waveform PP7 may monotonically increase to the potential VH1 or the potential VL2.

In any cases, the waveform PP7 does not include a maintenance element that maintains a constant potential for a predetermined time or more. The “predetermined time” is, for example, a period of 0.1 TC or more. In the present embodiment, “TC” indicates the natural vibration cycle generated in the ink in the ejection unit D.

Compared with the case where the waveform PP7 includes a maintenance element, the ink jet printer 1 can be driven faster because the cavity CV expansion does not need to be stopped once.

In the example shown in FIG. 7, the time length of the period from the beginning of the waveform PP1 to the beginning of the waveform PP7 is 0.85 Tc or more and 1.15 Tc or less. In other words, the total time length of the control period Q1, the control period Q2, the control period Q3, and the control period Q6 is 0.85 Tc or more and 1.15 Tc or less. The time length of the period from the beginning of the waveform PP3(1) to the beginning of the waveform PP9 is 1.0 Tc or more and 1.4 Tc or less. In other words, the total time length of the control period Q3, the control period Q6, the control period Q7, and the control period Q8 is 1.0 Tc or more and 1.4 Tc or less. The time length of the period from the end of the waveform PP3(1) to the end of the waveform PP9 is 1.0 Tc or more and 1.4 Tc or less. In other words, the total time length of the control period Q6, the control period Q7, the control period Q8, and the control period Q9 is 1.0 Tc or more and 1.4 Tc or less. The waveform PP6 couples the waveform PA1-1 and the waveform PA2-1. The waveform PP6 is an example of a “coupling element”. The waveform PP6 couples the end of the waveform PP3(1) and the beginning of the waveform PP7 and maintains a constant potential. The waveform PP6 in the present embodiment maintains the potential VH1 during a period of 0.3 Tc or more and 0.5 Tc or less.

Since the waveform PP6 has a time length of 0.5 Tc or less as a period during which the potential VH1 is maintained, a droplet at the time of the first shot ejected by the waveform PP3(1) and a droplet at the time of the second shot ejected by the waveform PP9 can merge more reliably. As a result, the ink ejection weight is ensured. In addition, the reliable merging of a droplet at the time of the first shot and a droplet at the time of the second shot ensures the ejection weight at the exact location, compared with a case where at least one of a droplet at the time of the first shot and a droplet at the time of the second shot does not land correctly. In addition, since a liquid at the time of the first shot and a liquid at the time of the second shot merge before landing, the straightness, and the like of the droplets is improved, compared with when the droplets individually fly without merging.

In the example shown in FIG. 7, the potential difference between the potential VL2 and the potential VH2 in the waveform PP9 is greater than or equal to the potential difference between the potential VL1 and the potential VH1 in the waveform PP3(1). The potential difference between the potential VL1 and the potential VH1 in the waveform PP3(1) is than 0.6 times or more the potential difference between the potential VL2 and the potential VH2 in the waveform PP9. In this specification, the "potential difference between the potential A and the potential B" means the absolute value of the difference between the potential A and the potential B.

By ensuring the potential difference in the waveform PP3(1) by a predetermined amount or more, the desired amount or more of ink can be ejected.

The rate of change in the waveform PP9 from the potential VL2 to the potential VH2 is greater than the rate of change in the waveform PP3(1) from the potential VL1 to the potential VH1.

Therefore, a droplet at the time of the first shot ejected by the waveform PP3(1) and a droplet at the time of the second shot ejected by the waveform PP9 can merge more reliably. As a result, the ink ejection weight is ensured.

The time length of the period from the beginning of the waveform PP1 to the beginning of the waveform PP3(1) is 0.45 Tc or more and 0.55 Tc or less. In other words, the total time length of the control period Q1 and the control period Q2 is 0.45 Tc or more and 0.55 Tc or less. The time length of the period from the beginning of the waveform PP7 to the beginning of the waveform PP9 is 0.6 Tc or more and 0.8 Tc or less. In other words, the total time length of the control period Q7 and the control period Q8 is 0.6 Tc or more and 0.8 Tc or less.

Since the time length of the period from the beginning of the waveform PP1 to the beginning of the waveform PP3(1) is shorter than the time length of the period from the beginning of the waveform PP7 to the beginning of the waveform PP9, the ink jet printer 1 can reduce scattering of the ink.

The waveform PA1-1 has the waveform PP2 that maintains the potential VL1 from the end of the waveform PP1 to the beginning of the waveform PP3(1). The waveform PA2-1 has the waveform PP8 that maintains the potential VL2 from the end of the waveform PP7 to the beginning of the waveform PP9. The time length of each of the period of the waveform PP2 and the period of the waveform PP8 is 0.2 Tc and 0.4 Tc or less. In other words, the time length of each of the control period Q2 and the control period Q8 is 0.2 Tc or more and 0.4 Tc or less.

Since the time length of each of the period of the waveform PP2 and the period of the waveform PP8 is within the predetermined range, a droplet at the time of the first shot ejected by the waveform PP3(1) and a droplet at the time of the second shot ejected by the waveform PP9 can merge more reliably. As a result, the ink ejection weight is ensured.

The reference potential V0 of the waveform PP1 is an example of a "first potential". The potential VL1 of the waveform PP1 is an example of a "second potential". The waveform PP1 is an example of a "first expansion element". The waveform PP2 is an example of a "first maintenance element". The potential VL1 of the waveform PP3(1) is an example of a "second potential". The potential VH1 of the waveform PP3(1) is an example of a "third potential". The waveform PP3(1) is an example of a "first ejection element".

The potential VH1 of the waveform PP7 is an example of a "fourth potential". The potential VL2 of the waveform PP7 is an example of a "fifth potential". The waveform PP7 is an example of a "second expansion element". The waveform PP8 is an example of a "second maintenance element". The potential VL2 of the waveform PP9 is an example of a "fifth potential". The potential VH2 of the waveform PP9 is an example of a "sixth potential". The waveform PP9 is an example of a "second ejection element". The reference potential V0 of the waveform PP11 is an example of a "seventh potential".

The control period Q7 is an example of a "first period". The control period Q1 is an example of a "second period".

1-4. Waveform of Drive Signal Com0 in Comparative Example

Figure 8:
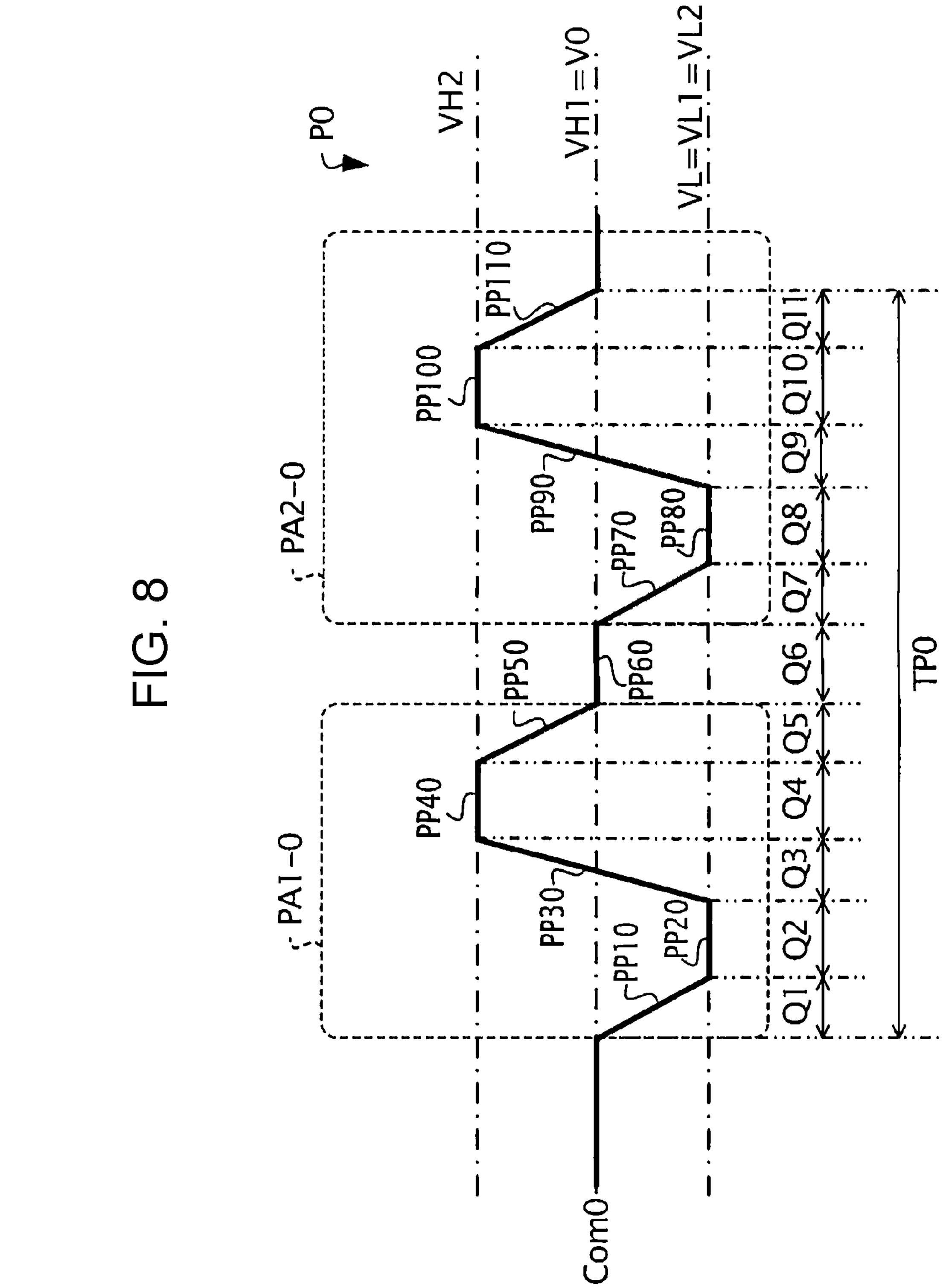
FIG. 8 is an example of a timing chart showing a drive signal Com in the first embodiment.

FIG. 8 is an example of a timing chart showing a drive signal Com0 in a comparative example. As illustrated in FIG. 8, in the comparative example, the drive signal Com0 has a waveform P0 provided in a unit period TP0.

The waveform P0 in the comparative example includes a waveform PA1-0 and a waveform PA2-0. The waveform PA1-0 and the waveform PA2-0 are defined so that a droplet ejected from the ejection unit D[m] with the waveform PA1-0 and a droplet ejected from the ejection unit D[m] with the waveform PA2-0 merge before landing on the medium when the supply drive signal Vin[m] with the waveform PA1-0 and the waveform PA2-0 in the comparative example is supplied to the ejection unit D[m], and the merged droplets correspond to the ink amount $\xi$1. The waveform PA1-0 includes the waveform PP10, a waveform PP20, a waveform PP30, a waveform PP40, and a waveform PP50. The waveform PP10 and the waveform PP20 in the waveform PA1-0 according to the comparative example are similar to the waveform PP1 and the waveform PP2 in the present embodiment. However, in the waveform PA1-0 of the comparative example, the waveform PP30 changes from the potential VL to the potential VH2 above the reference potential V0, then the waveform PP40 maintains the potential VH2, and then the waveform PP50 changes from the potential VH2 to the reference potential V0. The waveform PA1-0 of the comparative example secures the amount of ink to be ejected with the waveform PP30 that changes from the potential VL to the potential VH2 beyond the reference potential V0, suppresses the residual vibration of the ink in the ejection unit D that occurs after the waveform PP30 is supplied by driving the waveform PP40 and the waveform PP50, and suppresses the instability of droplet ejection from the ejection unit D due to driving of the next waveform PA2-0.

When the distance from the nozzle N to the medium is longer than usual, it is difficult to land the droplet ejected from the nozzle N at the desired position due to air resistance and surrounding air currents during flight. Therefore, the droplets continuously ejected from the nozzle N are merged to increase their weight, thereby maintaining their straightness and suppressing misting to improve the accuracy of landing. In addition, there is a growing demand for a faster printing speed for the ink jet printer 1 to improve productivity. Specifically, a drive frequency of the piezoelectric element PZ of 30 kHz or higher may be required as an example. However, in order to set the drive frequency to 30 kHz or higher, when the drive signal Com0 in the unit period TP0 includes two shots of waveforms of the waveform PA1-0 and the waveform PA2-0 as shown in FIG. 8, each of the control periods Q1 to Q11 is required to be shortened in order to set the drive frequency of the piezoelectric element PZ at 30 kHz or higher while ensuring the accuracy of landing of the droplet ejected from the nozzle N. However, when each control period Q1 to Q11 is simply shortened, the interference between pressure vibration and residual vibration caused by driving the waveform PA1-0 and the waveform PA2-0 will make the ejection unstable and the ink will easily scatter from the nozzle N. As a method of suppressing unstable ejection and ink scattering caused by interference of such residual vibration, it is conceivable to shorten a cycle Tc of the residual vibration generated in the ejection unit D[m] when the piezoelectric element PZ[m] is driven, but when the cavity CV structure is modified so that the cycle Tc is shorter, the amount of ink to be ejected will decrease. When the pressure vibration generated by driving the piezoelectric element PZ[m] is simply weakened in order to suppress ejection instability and ink scattering due to the interference of the aforementioned residual vibration, the ink amount of the ejected droplet will also decrease. A decrease in the ink amount of the droplet results in a decrease in the amount of ink that lands on the medium per unit time in printing by the ink jet printer 1, resulting in a decrease in printing efficiency. On the other hand, in the waveform PA1-1 in the waveform P1 of the present embodiment, the end of the waveform PP3(1) that changes from the potential VL1 to the potential VH1 is coupled directly to the waveform PP6, and the unit period TP does not include the control period Q4 and the control period Q5 shown in the comparative example. Furthermore, the configuration of the waveforms PP1 to PP3(1) and PP6 to PP11 of the waveform P1 as described above can shorten the unit period TP of the waveform P1 in the present embodiment, compared with the unit period TP0 of the waveform P0 in the comparative example, but still ensure the ejection amount and the ejection stability, and a plurality of droplets ejected during the unit period TP can be emerged reliably to land the emerged droplets at the exact location on the medium. Therefore, the ink jet printer 1 in the present embodiment can achieve a faster printing speed while ensuring printing quality.

1-5. Effects of First Embodiment

The ink jet printer 1 according to the present embodiment includes the ejection unit D and the drive signal generation unit 4. The ejection unit D includes the nozzle N[m] from which the ink to be landed on the recording paper PR is eject, the cavity CV[m] that is in communication with the nozzle N[m] and through which the ink flows, and the piezoelectric element PZ[m] that generate pressure fluctuations of the ink in the cavity CV when the drive signal Com is supplied. The drive signal generation unit 4 generates the drive signal Com. The drive signal Com contains a plurality of the waveforms PA corresponding to a plurality of droplets that emerges before landing on the recording paper PR. The first waveform PA1-1 of the plurality of the waveforms PA in chronological order includes the waveform PP1 and the waveform PP3(1). The waveform PP1 changes from the reference potential V0 to the potential VL1 and drives the piezoelectric element PZ[m] so as to expand the volume of the cavity CV[m]. The waveform PP3(1) changes from the potential VL1 to the potential VH1, causes the volume of the cavity CV[m] that was expanded by the waveform PP1 to contract, and ejects a droplet from the nozzle N[m]. The waveform PA2-1 that follows the waveform PA1-1 in chronological order among the plurality of the waveforms PA includes the waveform PP7 and the waveform PP9. The waveform PP7 changes from the potential VH1 to the potential VL2, and drives the piezoelectric element PZ[m] so as to expand the volume of the cavity CV[m]. The waveform PP9 changes from the potential VL2 to the potential VH2, causes the volume of the cavity CV[m] that was expanded by the waveform PP7 to contract, and ejects a droplet from the nozzle N[m]. The time length of the control period Q7 that is the period of a change from the potential VH1 to the potential VL2 in the waveform PP7 is longer than the time length of the control period Q1 that is the period of a change from the reference potential V0 to the potential VL1 in the waveform PP1.

The ink jet printer 1 can reduce scattering of the ink from the nozzle N [m] by making the time length of the control period Q7 longer than the time length of the control period Q1.

The time length of the control period Q7 is 1.5 times or more and 3 times or less the time length of the control period Q1.

The ink jet printer 1 can reduce scattering of the ink from the nozzle N [m] by performing setting so that the time length of the control period Q7 is 1.5 times or more and 3 times or less the time length of the control period Q1.

The potential change rate from the potential VH1 to the potential VL2 of the waveform PP7 is smaller than the potential change rate from the reference potential V0 to the potential VL1 of the waveform PP1.

The ink jet printer 1 can reduce scattering of the ink from the nozzles N[m] by making the potential change rate from the potential VH1 to the potential VL2 of the waveform PP7 smaller than the potential change rate from the reference potential V0 to the potential VL1 of the waveform PP1.

The waveform PA1-1 includes the waveform PP2, which is an element that maintains the potential VL1 from the end of the waveform PP1 to the beginning of the waveform PP3(1), and the waveform PP1 begins at the waveform PP1 and ends at the waveform PP3(1). The drive signal Com includes the waveform PP6 that maintains the potential VH1 from the end of the waveform PA1-1 to the beginning of the waveform PA1-2. The waveform PP7 monotonically increases or decreases from the potential VH1 to the potential VL2.

The ink jet printer 1 can be driven faster when the waveform PA1-1 includes the waveform PP1, the waveform PP2, and the waveform PP3(1), and the waveform PP7 does not include a maintenance element that maintains a constant potential for a predetermined time or more.

The time length of the period from the beginning of the waveform PP1 to the beginning of the waveform PP7 is 0.85 Tc or more and 1.15 Tc or less where Tc is a natural vibration cycle of the vibration generated in the ejection unit D[m] when the piezoelectric element PZ[m] is driven by the drive signal Com.

Since the time length of the period from the beginning of the waveform PP1 to the beginning of the waveform PP7 is within the predetermined range, a droplet at the time of the first shot ejected by a waveform PP3 and a droplet at the time of the second shot ejected by the waveform PP9 can merge more securely. As a result, the ink ejection weight is ensured.

The time length of the period from the beginning of the waveform PP3(1) to the beginning of the waveform PP9 is 1Tc or more and 1.4Tc or less where Tc is a natural vibration cycle of the vibration generated in the ejection unit D[m] when the piezoelectric element PZ[m] is driven by the drive signal Com.

Since the time length of the period from the beginning of the waveform PP3(1) to the beginning of the waveform PP9 is within the predetermined range, a droplet at the time of the first shot ejected by the waveform PP3(1) and a droplet at the time of the second shot ejected by the waveform PP9 can merge more securely. As a result, the ink ejection weight is ensured.

The time length of the period from the end of the waveform PP3(1) to the end of the waveform PP9 is 1.0 Tc or more and 1.4 Tc or less where Tc is a natural vibration cycle of the vibration generated in the ejection unit D[m] when the piezoelectric element PZ[m] is driven by the drive signal Com.

Since the time length of the period from the end of the waveform PP3(1) to the end of the waveform PP9 is within the predetermined range, a droplet at the time of the first shot ejected by the waveform PP3(1) and a droplet at the time of the second shot ejected by the waveform PP9 can merge more securely. As a result, the ink ejection weight is ensured.

The drive signal Com includes a waveform PP6 that couples the waveform PA1-1 and the waveform PA2-1. The waveform PP6 is coupled to the waveform PP3(1). The waveform PP6 includes an element that maintains the potential VH1 during a period of 0.3 Tc or more and 0.5 Tc or less where Tc is a natural vibration cycle of the vibration generated in the ejection unit D[m] when the piezoelectric element PZ[m] is driven by the drive signal Com.

The period during which the waveform PP6 maintains the potential VH1 is within a predetermined range, so that a droplet at the time of the first shot ejected by the waveform PP3(1) and a droplet at the time of the second shot ejected by the waveform PP9 can merge more reliably. As a result, the ink ejection weight is ensured.

The potential difference between the potential VL2 and the potential VH2 of the waveform PP9 is greater than or equal to the potential difference between the potential VL1 and the potential VH1 of the waveform PP3(1).

Therefore, a droplet at the time of the first shot ejected by the waveform PP3(1) and a droplet at the time of the second shot ejected by the waveform PP9 can merge more reliably. As a result, the ink ejection weight is ensured.

The potential difference between the potential VL1 and the potential VH1 in the waveform PP3(1) is than 0.6 times or more the potential difference between the potential VL2 and the potential VH2 in the waveform PP9.

By ensuring the potential difference in the waveform PP3(1) by a predetermined amount or more, the waveform PP3(1) can reduce an event in which the ink is not ejected.

The waveform PA2-1 further includes the waveform PP11 that changes from the potential VH2 to the reference potential V0 and suppresses the vibration of the liquid in the ejection unit D. Although the potential difference between the potential VL2 and the potential VH2 of the waveform PP9 of the waveform PA2-1 is larger than the potential difference between the potential VL1 and the potential VH1 of the waveform PP3(1), the waveform PP11 can suppress the residual vibration in the ejection unit D, thus stabilizing the ejection by the waveform PA1-1 in the next unit period TP.

The potential change rate from the potential VL2 to the potential VH2 of the waveform PP9 is greater than the potential change rate from the potential VL1 to the potential VH1 of the waveform PP3(1).

Therefore, a droplet at the time of the first shot ejected by the waveform PP3(1) and a droplet at the time of the second shot ejected by the waveform PP9 can merge more reliably. As a result, the ink ejection weight is ensured.

The time length of the period from the beginning of the waveform PP1 to the beginning of the waveform PP3(1) is 0.45 Tc or more and 0.55 Tc or less. The time length of the period from the beginning of the waveform PP7 to the beginning of the waveform PP9 is 0.6 Tc or more and 0.8 Tc or less.

Since the time length of the period from the beginning of the waveform PP1 to the beginning of the waveform PP3(1) is shorter than the time length of the period from the beginning of the waveform PP7 to the beginning of the waveform PP9, the ink jet printer 1 can reduce scattering of the ink.

The waveform PA1-1 includes the waveform PP2 that maintains the potential VL1 from the end of the waveform PP1 to the beginning of the waveform PP3(1). The waveform PA2-1 includes the waveform PP8 that maintains the potential VL2 from the end of the waveform PP7 to the beginning of the waveform PP9. The time length of each of the waveform PP2 and the waveform PP8 is 0.2 Tc or more and 0.4 Tc or less.

Since the time length of each of the waveform PP2 and the waveform PP8 is within the predetermined range, a droplet at the time of the first shot ejected by the waveform PP3(1) and a droplet at the time of the second shot ejected by the waveform PP9 can merge more reliably. As a result, the ink ejection weight is ensured.

The drive signal Com is set to the reference potential V0 at the beginning of the unit period TP in which a plurality of the waveforms PA is provided, and is set to the reference potential V0 at the end of the unit period TP. The drive signal Com includes a waveform PP6 that couples the waveform PA1-1 and the waveform PA2-1. The waveform PP6 maintains the potential VH1.

Therefore, the ink jet printer 1 can ensure printing gradation by ensuring that the period from the rise to the fall of the pulse PLC in the change signal CH is included in the period from the beginning to the end of the waveform PP6.

2. Second Embodiment

The liquid ejection apparatus according to the second embodiment is described below with reference to FIG. 9. The configuration of the liquid ejection apparatus according to the present embodiment is identical to the configuration of the liquid ejection apparatus according to the first embodiment, except for the waveform of the drive signal Com. For this reason, the waveform of the drive signal Com in the present embodiment is mainly described below.

2-1. Waveform of Drive Signal Com in Second Embodiment

Figure 9:
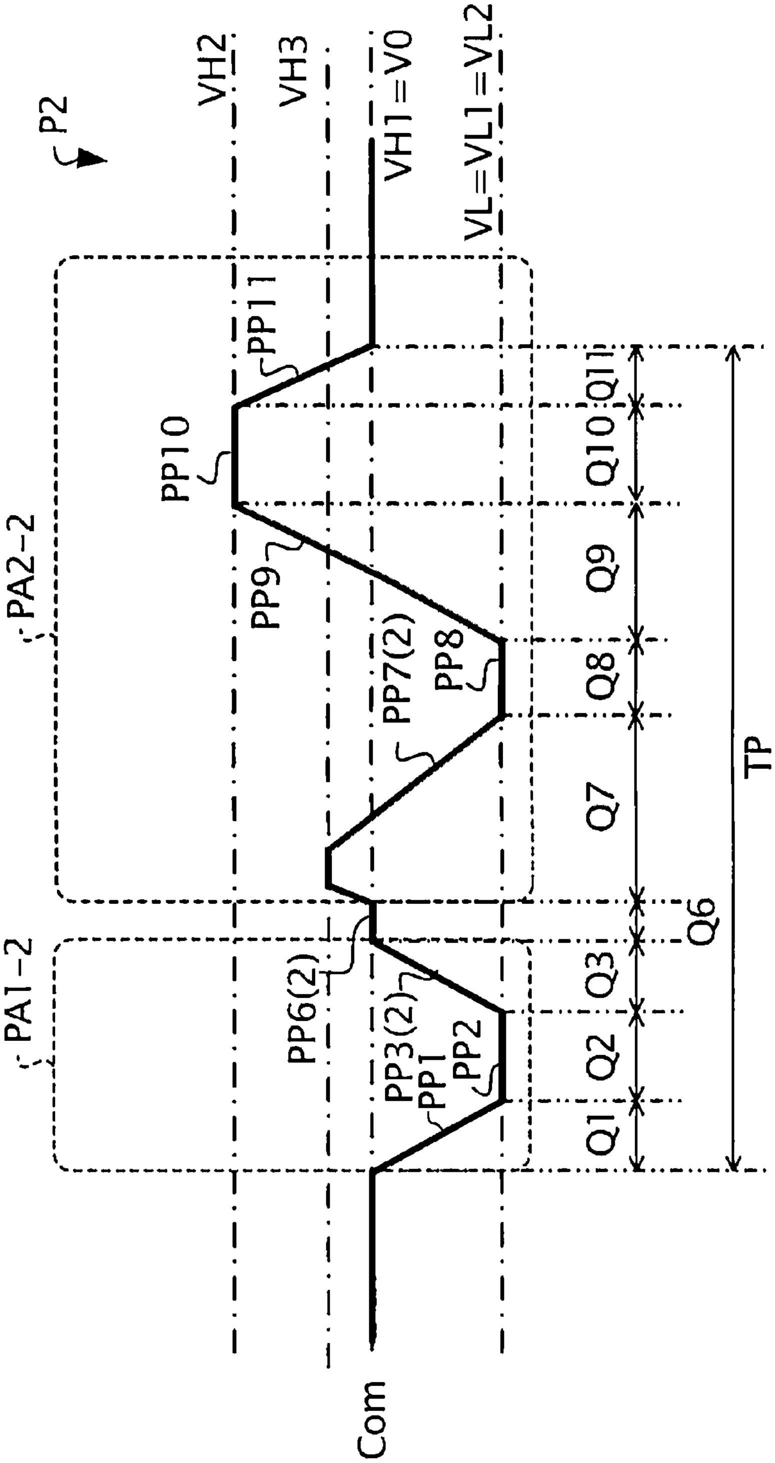
FIG. 9 is an example of a timing chart showing a drive signal Com in the second embodiment.

FIG. 9 is an example of a timing chart showing the drive signal Com in the second embodiment. As illustrated in FIG. 9, in the present embodiment, the drive signal Com has a waveform P2 provided in the unit period TP. In the following, mainly focusing on the points where the waveform P2 differs from the waveform P1 according to the first embodiment, the features of the waveform P2 are described.

The waveform P2 includes the waveform PP6(2) instead of the waveform PP6 of the waveform P1 and a waveform PP7(2) instead of the waveform PP7 of the waveform P1. As described below, the waveform PP7(2) includes a contraction element that contracts the cavity CV and a maintenance element that maintains the contraction before the cavity CV volume is expanded by the second expansion element.

In FIG. 9, the potential VL=the potential VL1=the potential VL2. The potential VL is lower than the reference potential V0. The potential VH1 is equal to the reference potential V0. The potential VH2 and a potential VH3 are higher than the potential VH1. The potential VH2 is higher than the potential VH3.

The waveform P2 includes the waveform PA1-2 and a waveform PA2-2. The waveform PA1-2 is an example of a "first ejection pulse" corresponding to the waveform PA1-1. The waveform PA2-2 is an example of a "second ejection pulse" corresponding to the waveform PA2-1. The waveform PA1-2 includes the waveform PP1, the waveform PP2, and a waveform PP3(2). As in the waveform PP1 in the waveform P1, the waveform PP1 changes from the reference potential V0 to the potential VL1 in the control period Q1. As in the waveform PP2 in the waveform P1, the waveform PP2 maintains the potential VL1 during the control period Q2, similar to. As in the waveform PP3(1) in the waveform P1, the waveform PP3(2) changes from the potential VL1 to the potential VH1 in the control period Q3.

The waveform PA2-2 includes the waveform PP7(2), the waveform PP8, the waveform PP9, the waveform PP10, and the waveform PP11. The waveform PP7(2) changes from the potential VH1 to the potential VH3, then maintains the potential VH3 for a predetermined period, and then changes from the potential VH3 to the potential VL2 in the control period Q7. As in the waveform PP8 in the waveform P1, the waveform PP8 maintains the potential VL2 during the control period Q8. As in the waveform PP9 in the waveform P1, the waveform PP9 changes from the potential VL2 to the potential VH2 in the control period Q9. As in the waveform PP10 in the waveform P1, the waveform PP10 maintains the potential VH2 during the control period Q10. As in the waveform PP11 in the waveform P1, the waveform PP11 changes from the potential VH2 to the reference potential V0 in the control period Q11. The waveform PP6(2) couples the end of the waveform PP3(2), which is the end of the waveform PA1-2, and the beginning of a waveform PP71, which is the beginning of the waveform PA2-2, in the control period Q6. The waveform PP6(2) maintains the potential VH1.

Figure 10:
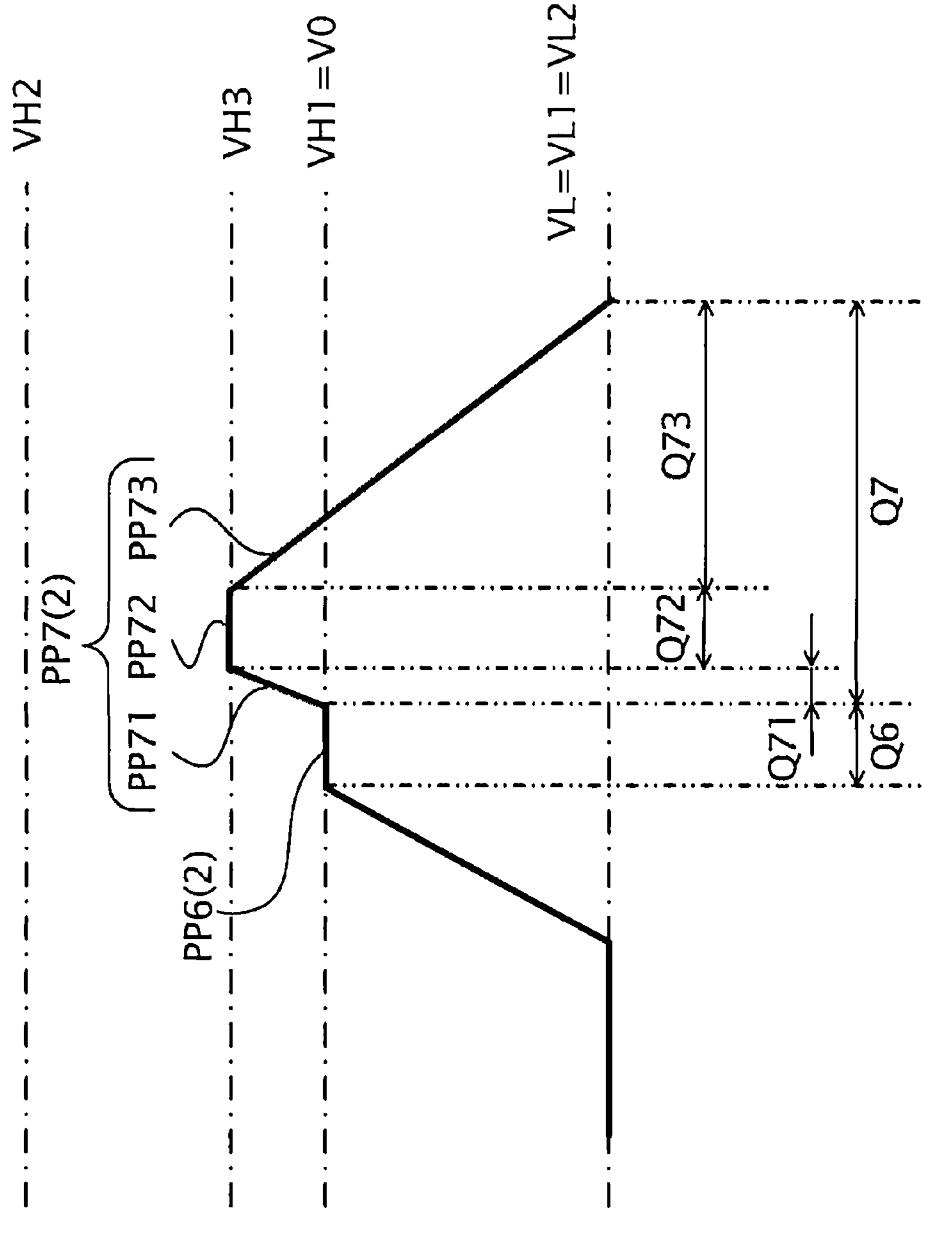
FIG. 10 is an enlarged view of a waveform PP6(2).

FIG. 10 is an enlarged view of the waveform PP6(2) and the waveform PP7(2). The waveform PP6(2) couples the end of the waveform PP3(2) in the waveform PA1-2 and the beginning of the waveform PP71, which is the beginning of the waveform PP7(2) in the waveform PA2-2. The potential at the end of the waveform PP3(2) is the potential VH1. The potential at the beginning of the waveform PP71 is the potential VH1. As shown above, the potential VH1 is equal to the reference potential V0. The control period Q7 includes, in chronological order, a control period Q71, a control period Q72, and a control period Q73. The waveform PP7(2) includes the waveform PP71 in the control period Q71, a waveform PP72 in the control period Q72, and a waveform PP73 in the control period Q73. The waveform PP71 is a waveform that changes from the potential VH1 to the potential VH3 and is an example of a "pre-contraction element" that contracts the volume of the cavity CV before the second expansion element. The waveform PP72 is a waveform that maintains the potential VH3 and is an example of a "maintenance element" that maintains the volume of the cavity CV contracted by the waveform PP71.

Since the waveform PP6(2) is a waveform that maintains the potential VH1, the ink jet printer 1 can ensure printing gradation by ensuring that the period from the rise to the fall of the pulse PLC in the change signal CH is included in the period from the beginning to the end of the waveform PP6(2).

In the example shown in FIG. 9, the waveform PP71 in the waveform PP7(2) changes from the potential VH1 to the potential VH3, so that the potential difference between the potential VH3 and the potential VL2 of the waveform PP73 can be greater than or equal to the potential difference between the reference potential V0 and the potential VL1 of the waveform PP1.

Therefore, a droplet at the time of the first shot ejected by the waveform PP3(2) and a droplet at the time of the second shot ejected by the waveform PP9 can merge more reliably. In addition, the ink ejection weight is ensured.

The waveform PP7(2) includes the waveform PP72 that maintains the potential between the waveform PP71 and the waveform PP73 to suppress the unstable ejection due to interference between residual vibration caused by driving the waveform PP71 and pressure fluctuations caused by driving the waveform PP73.

In the example shown in FIG. 9, the reference potential V0 of the waveform PP1 is an example of a "first potential". The potential VL1 of the waveform PP1 is an example of a "second potential". The waveform PP1 is an example of a "first expansion element". The waveform PP2 is an example of a "first maintenance element". The potential VL1 of the waveform PP3(2) is an example of a "second potential". The potential VH1 of the waveform PP3(2) is an example of a "third potential". The waveform PP3(2) is an example of a "first ejection element". The waveform PP6(2) is an example of a "coupling element". The potential VH3 of the waveform PP73 in the waveform PP7(2) is an example of a "fourth potential". The potential VL2 of the waveform PP73 in the waveform PP7(2) is an example of a "fifth potential". The waveform PP73 in the waveform PP7(2) is an example of a "second expansion element". The potential VL2 of the waveform PP9 is an example of a "fifth potential". The potential VH2 of the waveform PP9 is an example of a "sixth potential". The waveform PP9 is an example of a "second ejection element". The reference potential V0 of the waveform PP11 is an example of a "seventh potential. The waveform PP11 is an example of a "damping element". The waveform PP6(2) is an example of a "coupling element".

2-2. Effects of Second Embodiment

In the ink jet printer 1 according to the second embodiment, the potential difference between the potential VH3 and the potential VL2 of the waveform PP73 in the waveform PP7(2) is greater than or equal to the potential difference between the reference potential V0 and the potential VL1 of the waveform PP1.

Therefore, a droplet at the time of the first shot ejected by the waveform PP3(2) and a droplet at the time of the second shot ejected by the waveform PP9 can merge more reliably. In addition, the ink ejection weight is ensured.

3. Third Embodiment

The liquid ejection apparatus according to the third embodiment is described below with reference to FIG. 11. The configuration of the liquid ejection apparatus according to the present embodiment is identical to the configuration of the liquid ejection apparatus according to the first embodiment, except for the waveform of the drive signal Com. For this reason, the waveform of the drive signal Com in the present embodiment is mainly described below.

3-1. Waveform of Drive Signal Com in Third Embodiment

Figure 11:
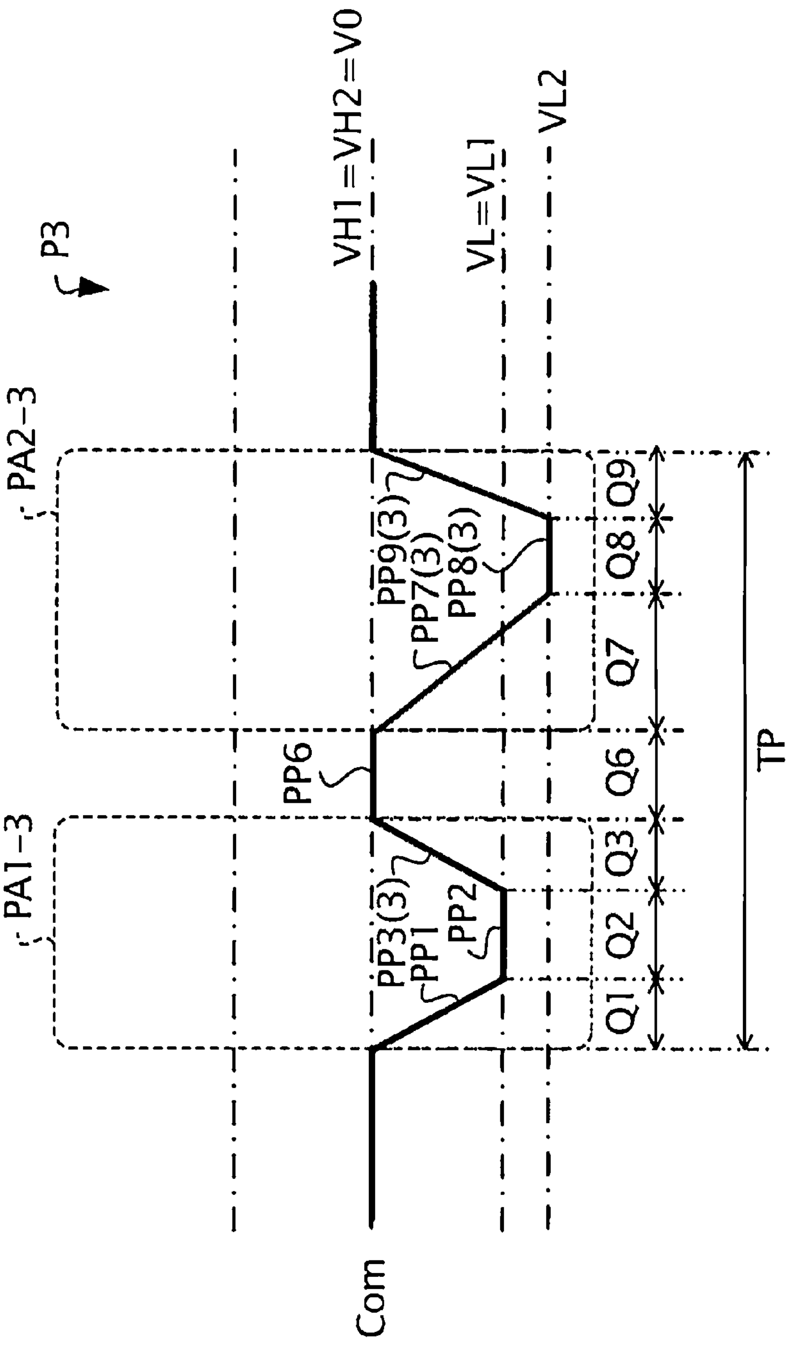
FIG. 11 is an example of a timing chart showing a drive signal Com in the third embodiment.

FIG. 11 is an example of a timing chart showing the drive signal Com in the third embodiment. As illustrated in FIG. 11, in the present embodiment, the drive signal Com has a waveform P3 provided in the unit period TP. In the following, mainly focusing on the points where the waveform P3 differs from the waveform P1 according to the first embodiment, the features of the waveform P3 are described.

The waveform P3 does not have waveforms corresponding to the waveform PP10 and the waveform PP11 in the waveform P1.

In FIG. 11, the potential VL=the potential VL1. The potential VL is lower than the reference potential V0. The potential VL2 is lower than the reference potential V0 and the potential VL1. The potential VH1 and the potential VH2 are equal to the reference potential V0.

The waveform P3 includes a waveform PA1-3 and a waveform PA2-3. The waveform PA1-3 is an example of a "first ejection pulse" corresponding to the waveform PA1-1. The waveform PA2-3 is an example of a "second ejection pulse". The waveform PA1-3 includes the waveform PP1, the waveform PP2, and a waveform PP3(3). As in the waveform PP1 in the waveform P1, the waveform PP1 changes from the reference potential V0 to the potential VL1 in the control period Q1. As in the waveform PP2 in the waveform P1, the waveform PP2 maintains the potential VL1 during the control period Q2, similar to. As in the waveform PP3(1) in the waveform P1, the waveform PP3(3) changes from the potential VL1 to the potential VH1 in the control period Q3.

The waveform PA2-3 includes a waveform PP7(3), a waveform PP8(3), and a waveform PP9(3). In other words, the waveform PA2-3 does not include the waveform PP10 and the waveform PP11 unlike the waveform PA2-1 according to the first embodiment and. The waveform PP7(3) changes from the potential VH1 to the potential VL2 in the control period Q7. The waveform PP8(3) maintains the potential VL2 during the control period Q8. The waveform PP9(3) changes from the potential VL2 to the potential VH2 in the control period Q9. The potential VH2 is equal to the reference potential V0.

The waveform PP6 couples the end of the waveform PP3(3), which is the end of the waveform PA1-3, and the beginning of the waveform PP7(3), which is the beginning of the waveform PA2-3. As in the waveform PP6 according to the first embodiment, the waveform PP6 maintains the potential VH1. As shown above, the potential VH1 is equal to the reference potential V0.

In the example shown in FIG. 11, the potential VH1 of the waveform PP1 is an example of a "first potential". The potential VL1 of the waveform PP1 is an example of a "second potential". The waveform PP1 is an example of a "first expansion element". The waveform PP2 is an example of a "first maintenance element". The potential VL1 of the waveform PP3(3) is an example of a "second potential". The potential VH1 of the waveform PP3(3) is an example of a "third potential". The waveform PP3(3) is an example of a "first ejection element". The potential VH1 of the waveform PP7(3) is an example of a "fourth potential". The potential VL2 of the waveform PP7(3) is an example of a "fifth potential". The waveform PP7(3) is an example of a "second expansion element". The potential VL2 of the waveform PP8(3) is an example of a "fifth potential". The waveform PP8(3) is an example of a "second maintenance element". The potential VL2 of the waveform PP9(3) is an example of a "fifth potential". The potential VH2 of the waveform PP9(3) is an example of a "sixth potential". The waveform PP9(3) is an example of a "second ejection element".

3-2. Effects of Third Embodiment

The ink jet printer 1 according to the third embodiment achieves the same effects as the ink jet printer 1 according to the first embodiment.

4. Fourth Embodiment

The liquid ejection apparatus according to the fourth embodiment is described below with reference to FIG. 12. The configuration of the liquid ejection apparatus according to the present embodiment is identical to the configuration of the liquid ejection apparatus according to the first embodiment, except for the waveform of the drive signal Com. For this reason, the waveform of the drive signal Com in the present embodiment is mainly described below.

4-1. Waveform of Drive Signal Com in Fourth Embodiment

Figure 12:
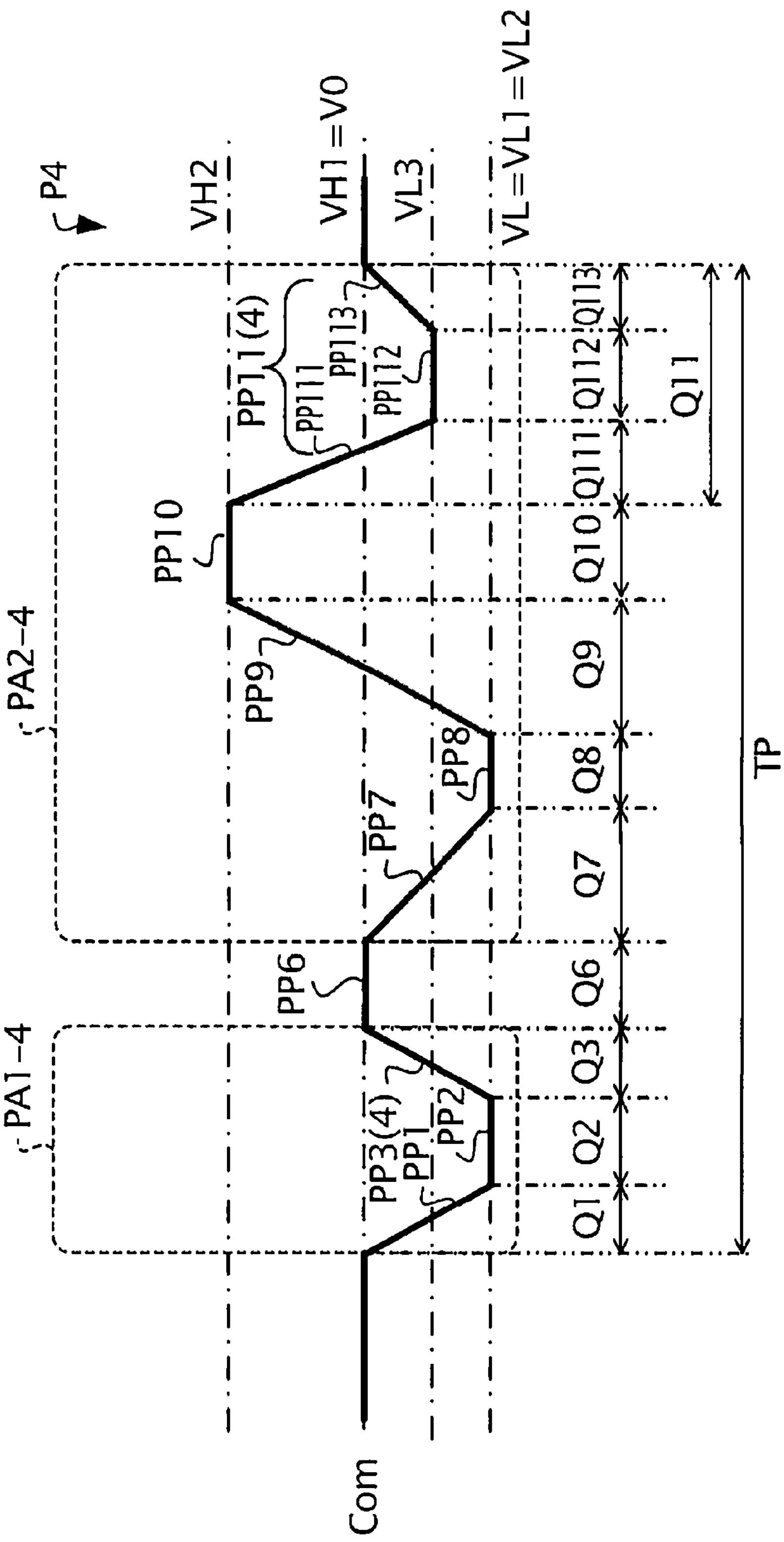
FIG. 12 is an example of a timing chart showing a drive signal Com in the fourth embodiment.

FIG. 12 is an example of a timing chart showing the drive signal Com in the fourth embodiment. As illustrated in FIG. 12, in the present embodiment, the drive signal Com has a waveform P4 provided in the unit period TP. In the following, mainly focusing on the points where the waveform P4 differs from the waveform P1 according to the first embodiment, the features of the waveform P4 are described.

The waveform P4 includes a waveform PP11(4) instead of the waveform PP11 in the waveform P1.

In FIG. 12, the potential VL=the potential VL1=the potential VL2. The potential VL is lower than the reference potential V0. A potential VL3 is a potential between the potential VL and the reference potential V0. The potential VH1 is equal to the reference potential V0. The potential VH2 is higher than the potential VH1.

The waveform P4 includes a waveform PA1-4 and a waveform PA2-4. The waveform PA1-4 corresponds to the waveform PA1-1. The waveform PA2-4 corresponds to the waveform PA2-1. The waveform PA1-4 includes the waveform PP1, the waveform PP2, and a waveform PP3(4). The waveform PP1 changes from the reference potential V0 to the potential VL1 in the control period Q1. The waveform PP2 maintains the potential VL1 during the control period Q2. As in the waveform PP3(1), the waveform PP3(4) changes from the potential VL1 to the potential VH1 in the control period Q3.

The waveform PA2-4 includes the waveform PP7, the waveform PP8, the waveform PP9, the waveform PP10, and the waveform PP11(4). The waveform PP7 changes from the potential VH1 to the potential VL2 in the control period Q7. The waveform PP8 maintains the potential VL2 during the control period Q8. The waveform PP9 changes from the potential VL2 to the potential VH2 in the control period Q9. The waveform PP10 maintains the potential VH2 during the control period Q10. The waveform PP11(4) changes from the potential VH2 to the potential VL3, then maintains the potential VL3, and then changes from the potential VL3 to the reference potential V0 in the control period Q11.

As in the waveform PP6 according to the first embodiment, the waveform PP6 maintains the potential VH1. As shown above, the potential VH1 is equal to the reference potential V0.

In the example shown in FIG. 12, the control period Q11 includes, in chronological order, a control period Q111, a control period Q112, and a control period Q113. The waveform PP11(4) includes a waveform PP111 in the control period Q111, a waveform PP112 in the control period Q112, and a waveform PP113 in the control period Q113. The waveform PP111 is a waveform that changes from the potential VH2 to the potential VL3, and has the effect of suppressing the residual vibration of the liquid in the ejection unit D by the waveform PP111 causing the volume of the cavity CV to expand at the timing when the pressure of the ink in the cavity CV increases due to residual pressure vibration of the ink in the ejection unit D after the second ejection element. The potential difference from the potential VH2 to the potential VL3 of the waveform PP111 of the present embodiment is larger than the potential difference from the potential VH2 to the reference potential V0 of the waveform PP11 of the first embodiment, and can dampen the residual vibration further. Subsequently, the waveform PP113 contracts the volume of the cavity CV at the timing when the pressure of the ink in the cavity CV drops due to the residual vibration of the ink in the ejection unit D, thus having the effect of suppressing the residual vibration of the liquid in the ejection unit D. In other words, the waveform PA2-4 includes the waveform PP11(4) as a damping element that suppresses the residual vibration of the ink in the ejection unit D[m]. The waveform PP11(4) suppresses the vibration of the ink in the ejection unit D[m] to stabilize the ink ejection from the nozzle N in the next unit period TP.

In the example shown in FIG. 12, the reference potential V0 of the waveform PP1 is an example of a "first potential". The potential VL1 of the waveform PP1 is an example of a "second potential". The waveform PP1 is an example of a "first expansion element". The waveform PP2 is an example of a "first maintenance element". The potential VL1 of the waveform PP3(4) is an example of a "second potential". The potential VH1 of the waveform PP3(4) is an example of a "third potential". The waveform PP3(4) is an example of a "first ejection element". The potential VH1 of the waveform PP7 is an example of a "fourth potential". The potential VL2 of the waveform PP7 is an example of a "fifth potential". The waveform PP7 is an example of a "second expansion element". The potential VL2 of the waveform PP9 is an example of a "fifth potential". The potential VH2 of the waveform PP9 is an example of a "sixth potential". The waveform PP9 is an example of a "second ejection element". The potential VL3 of the waveform PP11(4) is an example of a "seventh potential". The waveform PP11(4) is an example of a "damping element". The waveform PP6 is an example of a "coupling element".

4-2. Effects of Fourth Embodiment

In the ink jet printer 1 according to the fourth embodiment, the waveform PA2-4 includes a waveform P11(4) as a damping element that changes from the potential VH2 to the potential VL3 and then changes from the potential VL3 to the reference potential V0 to suppress the vibration of the ink in the ejection unit D[m].

Vibration of the ink in the ejection unit D[m] is suppressed, thereby stabilizing the ink ejection from the nozzle N.

5. Fifth Embodiment

The liquid ejection apparatus according to the fifth embodiment is described below with reference to FIG. 13. The configuration of the liquid ejection apparatus according to the present embodiment is identical to the configuration of the liquid ejection apparatus according to the first embodiment, except for the waveform of the drive signal Com. For this reason, the waveform of the drive signal Com in the present embodiment is mainly described below.

5-1. Waveform of Drive Signal Com in Fifth Embodiment

Figure 13:
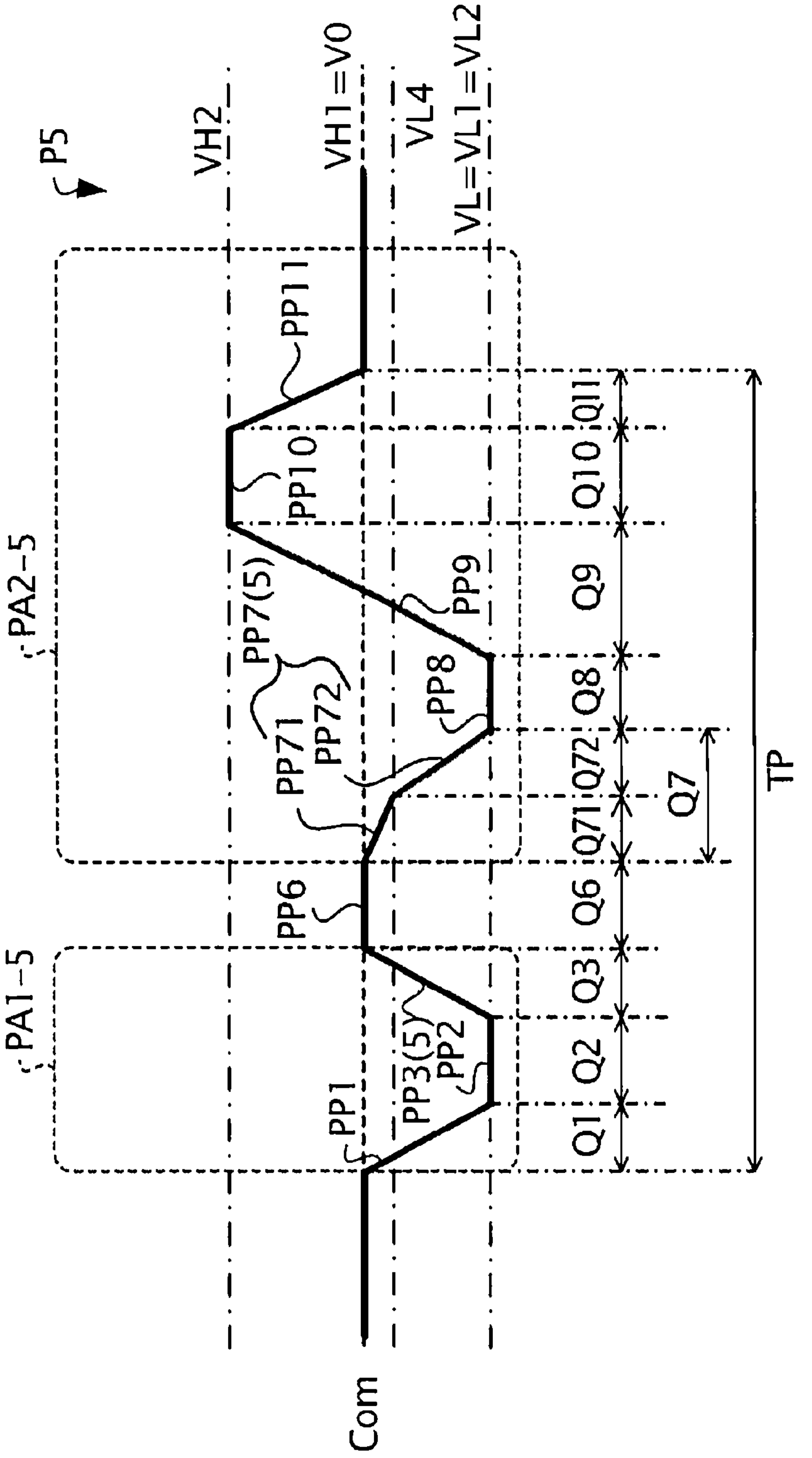
FIG. 13 is an example of a timing chart showing a drive signal Com in the fifth embodiment.

FIG. 13 is an example of a timing chart showing the drive signal Com in the fifth embodiment. As illustrated in FIG. 13, in the present embodiment, the drive signal Com has a waveform P5 provided in the unit period TP. In the following, mainly focusing on the points where the waveform P5 differs from the waveform P1 according to the first embodiment, the features of the waveform P5 are described.

The waveform P5 has a waveform PP7(5) instead of the waveform PP7 in the waveform P1. The waveform PP7(5) is a waveform in which the potential change rate changes in two steps.

In FIG. 13, the potential VL=the potential VL1=the potential VL2. The potential VL is lower than the reference potential V0. A potential VL4 is a potential between the potential VL and the potential VH1. The potential VH1 is equal to the reference potential V0. The potential VH2 is higher than the potential VH1.

The waveform P5 includes a waveform PA1-5 and a waveform PA2-5. The waveform PA1-5 is an example of a "first ejection pulse" corresponding to the waveform PA1-1. The waveform PA2-5 is an example of a "second ejection pulse" corresponding to the waveform PA2-1. The waveform PA1-5 includes the waveform PP1, the waveform PP2, and a waveform PP3(5). The waveform PP1 changes from the reference potential V0 to the potential VL1 in the control period Q1. The waveform PP2 maintains the potential VL1 during the control period Q2. As in the waveform PP3(1), the waveform PP3(5) changes from the potential VL1 to the potential VH1 in the control period Q3.

The waveform PA2-5 includes the waveform PP7(5), the waveform PP8, the waveform PP9, the waveform PP10, and the waveform PP11. The waveform PP7(5) changes from the potential VH1 to the potential VL2 in the control period Q7. The waveform PP8 maintains the potential VL2 during the control period Q8. The waveform PP9 changes from the potential VL2 to the potential VH2 in the control period Q9. The waveform PP10 maintains the potential VH2 during the control period Q10. The waveform PP11 changes from the potential VH2 to the reference potential V0 in the control period Q11.

The control period Q7 includes, in chronological order, the control period Q71 and the control period Q72. The waveform PP7(5) includes the waveform PP71 in the control period Q71 and the waveform PP72 in the control period Q72. The waveform PP71 is a waveform that changes from the potential VH1 to the potential VL4. The waveform PP72 is a waveform that changes from the potential VL4 to the potential VL2. As shown above, a potential VL4 is a potential between the potential VH1 and the potential VL2.

The potential change rate from the potential VL4 to the potential VL2 of the waveform PP72 is greater than the potential change rate from the potential VH1 to the potential VL4 of the waveform PP71.

Preferably, the potential difference between the potential VH1 and the potential VL4 of the waveform PP71 is 25% or less of the potential difference between the potential VL4 and the potential VL2 of the waveform PP72.

As shown in FIG. 13, the waveform PP71 and the waveform PP72 expands the volume of the cavity CV in two steps, and makes an expansion at the first step more gradual than an expansion at the second step, so that the ink jet printer 1 can suppress a rapid change in meniscus after the ink is ejected by the waveform PP3(5). As a result, the ink ejection from the ejection unit D[m] is stabilized.

In addition, the waveform PP6 maintains the potential VH1. As shown above, the potential VH1 is equal to the reference potential V0. Therefore, the ink jet printer 1 can ensure printing gradation by ensuring that the period from the rise to the fall of the pulse PLC in the change signal CH is included in the period from the beginning to the end of the waveform PP6.

In the example shown in FIG. 13, the reference potential V0 of the waveform PP1 is an example of a "first potential". The potential VL1 of the waveform PP1 is an example of a "second potential". The waveform PP1 is an example of a "first expansion element". The waveform PP2 is an example of a "first maintenance element". The potential VL1 of the waveform PP3(5) is an example of a "second potential". The potential VH1 of the waveform PP3(5) is an example of a "third potential". The waveform PP3(5) is an example of a "first ejection element". The potential VH1 of the waveform PP7(5) is an example of a "fourth potential". The potential VL2 of the waveform PP7(5) is an example of a "fifth potential". The waveform PP7(5) is an example of a "second expansion element". The potential VL2 of the waveform PP9 is an example of a "fifth potential". The potential VH2 of the waveform PP9 is an example of a "sixth potential". The waveform PP9 is an example of a "second ejection element". The reference potential V0 of the waveform PP11 is an example of a "seventh potential. The waveform PP11 is an example of a "damping element".

The waveform PP71 is an example of a "first partial element". The waveform PP72 is an example of a "second partial element". The potential VL4 of the waveform PP71 and the waveform PP72 is an example of an "eighth potential". The potential change rate from the potential VH1 to the potential VL4 of the waveform PP71 is an example of a "first potential change rate". The potential change rate from the potential VL4 to the potential VL2 of the waveform PP72 is an example of a "second potential change rate".

5-2. Effects of Fifth Embodiment

In the ink jet printer 1 according to the present embodiment, the waveform PP7 includes the waveform PP71 that changes from the potential VH1 at the first potential change rate, and the waveform PP72 that changes after waveform PP71 in chronological order at the second potential change rate greater than the first potential change rate.

Therefore, ink jet printer 1 can suppress a rapid change in meniscus after the ink is ejected by the waveform PP3(5). As a result, the ink ejection from the ejection unit D[m] is stabilized.

In the ink jet printer 1 according to the present embodiment, the waveform PP71 changes from the potential VH1 to the potential VL4 between the potential VH1 and the potential VL2. The waveform PP72 changes from the potential VL4 to the potential VL2. The potential difference between the potential VH1 and the potential VL4 is 25% or less of the potential difference between the potential VL4 and the potential VL2.

Therefore, ink jet printer 1 can suppress a rapid change in meniscus after the ink is ejected by the waveform PP3(5). As a result, the ink ejection from the ejection unit D[m] is stabilized.

6. Modifications

Each of the above embodiments can be variably modified. Specific modifications are illustrated below. The aspects in the following modifications and those shown in the above embodiments may be merged as appropriate to the extent that they are not mutually contradictory. In the modifications described below, elements having the same actions and functions as those of the embodiments will be denoted by the reference numerals used in the above description, and detailed description thereof will be appropriately omitted.

6-1. First Modification

In the above embodiment, the drive signal generation unit 4 generates the drive signal Com including one type of a drive signal. However, the drive signal generation unit 4 may generate the drive signal Com that includes a plurality of types of drive signals. As an example, the drive signal Com may include a drive signal Com-A and a drive signal Com-B.

In this case, the supply circuit 31 includes, in addition to the switch WS[m], two types of switches: a switch Wa[m] and a switch Wb[m] that are not shown. The coupling state designation circuit 310 generates a coupling state designation signal Qa[m] that designates the ON/OFF of the switch Wa[m] and a coupling state designation signal Qb[m] that designates the ON/OFF of the switch Wb[m] based on at least some signals of the print signal SI, the latch signal LAT, and the change signal CH supplied from the control unit 2.

When the switch Wa[m] is turned on based on the coupling state designation signal Qa[m], the drive signal Com-A is supplied to the upper electrode Zu[m] of the ejection unit D[m] as the supply drive signal Vin[m]. When the switch Wb[m] is turned on based on the coupling state designation signal Qb[m], the drive signal Com-B is supplied to the upper electrode Zu[m] of the ejection unit D[m] as the supply drive signal Vin[m].

When the drive signal Com-A is a waveform similar to the drive signal Com in the above embodiment, and both the drive signal Com-A and the drive signal Com-B include the waveform PP6 maintaining the reference potential V0 as the potential VH1 and are set to the reference potential V0 at the beginning and the end of the unit period TP, the ink jet printer 1 can supply either the drive signal Com-A or the drive signal Com-B to the upper electrode Zu[m] of the ejection unit D[m], or can seamlessly switch between the drive signal Com-A and the drive signal Com-B. As a result, ink jet printer 1 can ensure printing gradation.

6-2. Second Modification

The liquid ejection apparatus according to the present modification is described below with reference to FIG. 14. The configuration of the liquid ejection apparatus according to the present modification is identical to the configuration of the liquid ejection apparatus according to the first embodiment, except for the waveform of the drive signal Com. For this reason, the waveform of the drive signal Com in the present modification is mainly described below.

Figure 14:
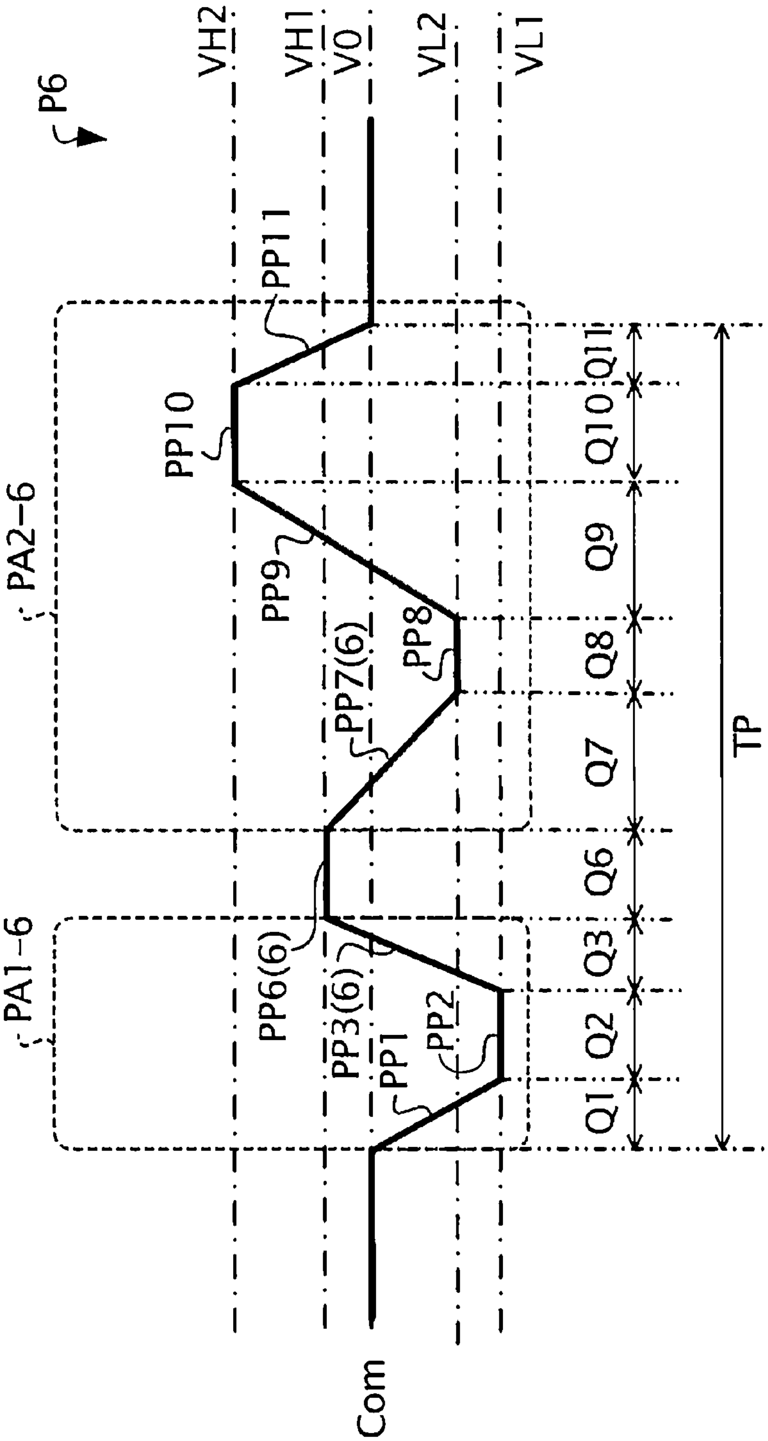
FIG. 14 is an example of a timing chart showing a drive signal Com in the second modification.

FIG. 14 is an example of a timing chart showing the drive signal Com in the present modification. As illustrated in FIG. 14, in the modification, the drive signal Com has a waveform P6 provided in the unit period TP. In the following, mainly focusing on the points where the waveform P6 differs from the waveform P1 according to the first embodiment, the features of the waveform P6 are described.

In the waveform P1, the potential VL1=potential VL2, but in the waveform P6, the potential VL1 and the potential VL2 are different from each other. In the waveform P1, the potential VH1=the reference potential V0, but in the waveform P6, the potential VH1 and the reference potential V0 are different from each other.

In FIG. 14, the potential VL1 and the potential VL2 are lower than the reference potential V0. The potential VL1 is lower than the potential VL2. The potential VH1 and the potential VH2 are higher than the reference potential V0. The potential VH2 is higher than the potential VH1. The potential VL2 can be higher than the potential VL1.

The waveform P6 includes a waveform PA1-6 and a waveform PA2-6. The waveform PA1-6 is an example of a "first ejection pulse" corresponding to the waveform PA1-1. The waveform PA2-6 is an example of a "second ejection pulse" corresponding to the waveform PA2-1. The waveform PA1-6 includes the waveform PP1, the waveform PP2, and a waveform PP3(6). The waveform PP1 changes from the reference potential V0 to the potential VL1 in the control period Q1. The waveform PP2 maintains the potential VL1 during the control period Q2. A waveform PP3 changes from the potential VL1 to the potential VH1 in the control period Q3.

The waveform PA2-6 includes a waveform PP7(6), the waveform PP8, a waveform PP9(6), the waveform PP10, and the waveform PP11. The waveform PP7(6) changes from the potential VH1 to the potential VL2 in the control period Q7. The waveform PP8 maintains the potential VL2 during the control period Q8. The waveform PP9(6) changes from the potential VL2 to the potential VH2 in the control period Q9. The waveform PP10 maintains the potential VH2 during the control period Q10. The waveform PP11 changes from the potential VH2 to the reference potential V0 in the control period Q11. Since a waveform PP6(6) is a waveform that maintains the potential VH1, the ink jet printer 1 can ensure printing gradation by ensuring that the period from the rise to the fall of the pulse PLC in the change signal CH is included in the period from the beginning to the end of the waveform PP6(6).

In the example shown in FIG. 14, the reference potential V0 of the waveform PP1 is an example of a "first potential". The potential VL1 of the waveform PP1 is an example of a "second potential". The waveform PP1 is an example of a "first expansion element". The waveform PP2 is an example of a "first maintenance element". The potential VL1 of the waveform PP3 is an example of a "second potential". The potential VH1 of the waveform PP3 is an example of a "third potential". The waveform PP3 is an example of a "first ejection element". The potential VH1 of the waveform PP7 is an example of a "fourth potential". The potential VL2 of the waveform PP7 is an example of a "fifth potential". The waveform PP7 is an example of a "second expansion element". The potential VL2 of the waveform PP9 is an example of a "fifth potential". The potential VH2 of the waveform PP9 is an example of a "sixth potential". The waveform PP9 is an example of a "second ejection element". The reference potential V0 of the waveform PP11 is an example of a "seventh potential. The waveform PP11 is an example of a "damping element". The waveform PP6(6) is an example of a "coupling element".

6-3. Third Modification

In the waveform P1 according to the first embodiment, the waveform PP7 monotonically decreases within the control period Q7. However, the waveform PP7 may have a period during which a substantially constant potential is maintained in part of the control period Q7. The same applies to the waveform P5 according to the fifth embodiment and the waveform P6 according to the second modification based on the waveform P2 in the second embodiment.

6-4. Fourth Modification

In the previous embodiment and the second modification, the waveform PP9 monotonically increases within the control period Q9. However, the waveform PP9 may have a period during which a substantially constant potential is maintained in part of the control period Q9.

6-5. Fifth Modification

In the above embodiment and the second modification, there were only two pulses in the unit period TP: the first ejection pulse and the second ejection pulse, but one or more pulses can be included in the unit period TP after the second ejection pulse.

What is claimed is:

1. A liquid ejection apparatus comprising:

an ejection unit including a nozzle from which a liquid to be landed on a medium is ejected, a pressure chamber that is in communication with the nozzle and through which a liquid flows, and a drive element that is configured to cause the liquid in the pressure chamber to pressure fluctuate in accordance with a drive signal that is supplied to the drive element; and a drive signal generator that is configured to generate the drive signal, wherein the drive signal includes a plurality of ejection pulses corresponding to a plurality of droplets that merges before landing on a medium, a first ejection pulse, of the plurality of ejection pulses, the first ejection pulse being a first pulse in chronological order, includes:

a first expansion element that changes from a first potential to a second potential and drives the drive element so as to expand a volume of the pressure chamber; and a first ejection element that changes from the second potential to a third potential, contracts the volume of the pressure chamber that was expanded by the first expansion element, and ejects a droplet from the nozzle, a second ejection pulse, of the plurality of ejection pulses, the second ejection pulse being a pulse following the first ejection pulse in chronological order, includes:

a second expansion element that changes from a fourth potential to a fifth potential and drives the drive element so as to expand the volume of the pressure chamber; and a second ejection element that changes from the fifth potential to a sixth potential, contracts the volume of the pressure chamber that was expanded by the second expansion element, and ejects a droplet from the nozzle, a time length of a first period that is a period in which the second expansion element changes from the fourth potential to the fifth potential is longer than a time length of a second period that is a period in which the first expansion element changes from the first potential to the second potential, and the second expansion element includes:

a first partial element that changes from the fourth potential at a first potential change rate; and a second partial element that changes after the first partial element in chronological order at a second potential change rate greater than the first potential change rate.

2. The liquid ejection apparatus according to claim 1, wherein the time length of the first period is 1.5 times or more and 3 times or less the time length of the second period.

3. The liquid ejection apparatus according to claim 1, wherein a potential change rate from the fourth potential to the fifth potential in the second expansion element is smaller than a potential change rate from the first potential to the second potential in the first expansion element.

4. The liquid ejection apparatus according to claim 1, wherein a potential difference between the fourth potential and the fifth potential in the second expansion element is greater than or equal to a potential difference between the first potential and the second potential in the first expansion element.

5. The liquid ejection apparatus of claim 1, wherein the first ejection pulse includes a first maintenance element that is an element that maintains the second potential from an end of the first expansion element to a beginning of the first ejection element, the first ejection pulse begins at a beginning of the first expansion element and ends at an end of the first ejection element such that the first ejection pulse is configured with the first expansion element, the first maintenance element, and the first ejection element in this order, the drive signal includes a coupling element that maintains a constant potential from an end of the first ejection pulse to a beginning of the second ejection pulse, and the second expansion element monotonically increases or decreases from the fourth potential to the fifth potential.

6. The liquid ejection apparatus according to claim 1, wherein a time length of a period from a beginning of the first expansion element to a beginning of the second expansion element is 0.85 Tc or more and 1.15 Tc or less where Tc is a natural vibration cycle of a vibration generated in the liquid in the ejection unit when the drive element is driven by the drive signal.

7. The liquid ejection apparatus according to claim 1, wherein a time length of a period from a beginning of the first ejection element to a beginning of the second ejection element is 1.0 Tc or more and 1.4 Tc or less where Tc is a natural vibration cycle of a vibration generated in the liquid in the ejection unit when the drive element is driven by the drive signal.

8. The liquid ejection apparatus according to claim 1, wherein a time length of a period from an end of the first ejection element to an end of the second ejection element is 1.0 Tc or more and 1.4 Tc or less where Tc is a natural vibration cycle of a vibration generated in the liquid in the ejection unit when the drive element is driven by the drive signal.

9. The liquid ejection apparatus according to claim 1, wherein the drive signal includes a coupling element coupling the first ejection pulse and the second ejection pulse, and the coupling element is coupled to the first ejection element and maintains the third potential during a period of 0.3 Tc or more and 0.5 Tc or less where Tc is a natural vibration cycle of a vibration generated in the liquid in the ejection unit when the drive element is driven by the drive signal.

10. The liquid ejection apparatus according to claim 9, wherein a potential difference between the fifth potential and the sixth potential in the second ejection element is greater than or equal to a potential difference between the second potential and the third potential in the first ejection element.

11. The liquid ejection apparatus according to claim 10, wherein a potential difference between the second potential and the third potential in the first ejection element is 0.6 times or more a potential difference between the fifth potential and the sixth potential in the second ejection element.

12. The liquid ejection apparatus according to claim 11, wherein the second ejection pulse further includes a damping element that changes from the sixth potential to a seventh potential and suppresses a vibration of the liquid in the ejection unit.

13. The liquid ejection apparatus according to claim 1, wherein a potential change rate from the fifth potential to the sixth potential in the second ejection element is greater than a potential change rate from the second potential to the third potential in the first ejection element.

14. The liquid ejection apparatus according to claim 1, wherein the first partial element changes from the fourth potential to an eighth potential between the fourth potential and the fifth potential, the second partial element changes from the eighth potential to the fifth potential, and a potential difference between the fourth potential and the eighth potential is 25% or less of a potential difference between the eighth potential and the fifth potential.

15. The liquid ejection apparatus according to claim 1, wherein a time length of a period from a beginning of the first expansion element to a beginning of the first ejection element is 0.45 Tc or more and 0.55 Tc or less, a time length of a period from a beginning of the second expansion element to a beginning of the second ejection element is 0.6 To or more and 0.8 To or less, and where Tc is a natural vibration cycle of a vibration generated in the liquid in the ejection unit when the drive element is driven by the drive signal.

16. The liquid ejection apparatus according to claim 15, wherein the first ejection pulse includes a first maintenance element that is an element that maintains the second potential from an end of the first expansion element to a beginning of the first ejection element, the second ejection pulse includes a second maintenance element that is an element that maintains the fifth potential from an end of the second expansion element to a beginning of the second ejection element, and a time length of each of a period of the first maintenance element and a period of the second maintenance element is 0.2 Tc or more and 0.4 Tc or less.

17. The liquid ejection apparatus according to claim 1, wherein the drive signal:

is set to the first potential at a beginning of a unit period in which the plurality of ejection pulses is provided and is set to the first potential at an end of the unit period; and includes a coupling element that couples the first ejection pulse and the second ejection pulse, and the coupling element maintains the first potential.

* * * * *